United States Patent [19]

Yoshida et al.

[11] Patent Number: 4,473,883

[45] Date of Patent: Sep. 25, 1984

[54] MACHINING SYSTEMS AND CONTROL SYSTEMS THEREFOR

[75] Inventors: Tetsu Yoshida; Isao Morimoto, both of Numazu, Japan

[73] Assignee: Toshiba Kikai Kabushiki Kaiha, Tokyo, Japan

[21] Appl. No.: 247,868

[22] Filed: Mar. 26, 1981

[30] Foreign Application Priority Data

Apr. 3, 1980 [JP] Japan .................................. 55-43998

[51] Int. Cl.³ ............................................ G06F 15/46
[52] U.S. Cl. ...................................... 364/474; 29/568; 235/375; 364/468
[58] Field of Search ............... 364/474, 475, 478, 167, 364/468, 469, 200 MS File, 900 MS File; 29/568, 564, 564.1, 564.7, 33 R, 33 P; 198/349, 356, 358; 414/134-136, 744, 753; 235/375, 383, 385

[56] References Cited

U.S. PATENT DOCUMENTS 3,576,540 4/1971 Fair et al. ..................... 364/167 X
4,109,188 8/1978 Shima et al. ..................... 29/568 X
4,237,598 12/1980 Williamson ..................... 364/478 X
4,309,600 1/1982 Perry et al. ..................... 29/33 P X Primary Examiner—Joseph F. Ruggiero
Attorney, Agent, or Firm—Koda and Androlia

[57] ABSTRACT

A machining system includes machine tools each capable of performing, in a working area thereof, machining on a workpiece carried on a pallet, a pallet magazine including movable stations each capable of carrying and conveying a pallet and having pallet change positions each associated with each of the machine tools, pallet changers each associated with each of the machine tools and each capable of transferring a pallet between the working area of the associated machine tool and the associated pallet change position, numerical control devices each associated with each of the machine tools and each capable of storing part programs and of controlling the associated machine tool, and a system controller comprising first memory for storing, in relation to each of schedule numbers indicating order of machining, an indicium of a pallet carrying a workpiece to be machined in the related order and an indicium of a part program to be used for machining the related pallet, and second memory for storing, in relation to an indicium of each of the pallets, and indicium of the movable station carrying the related pallet.

49 Claims, 26 Drawing Figures

FIG. 3

| S | T |   | P | A |   |   | S | T |   | P | A |   |   | S | T |   | P | A |   |   | S | T |   | P | A |   |   |
|---|---|---|---|---|---|---|---|---|---|---|---|---|---|---|---|---|---|---|---|---|---|---|---|---|---|---|---|
| 9 | 1 |   | 0 | 1 |   |   | 9 | 2 |   | 1 | 0 |   |   |   |   |   |   |   |   |   |   |   |   |   |   |   |   |
| 0 | 1 |   | 1 | 3 |   |   | 0 | 2 |   | 0 | 6 |   |   | 0 | 3 |   | 0 | 8 |   |   | 0 | 4 |   | 0 | 9 |   |   |
| 0 | 5 |   | 1 | 1 |   |   | 0 | 6 |   | 1 | 8 |   |   | 0 | 7 |   | 0 | 2 |   |   | 0 | 8 |   | 0 | 4 |   |   |
| 0 | 9 |   | 0 | 5 |   |   | 1 | 0 |   | 1 | 2 |   |   | 1 | 1 |   |   |   |   |   | 1 | 2 |   | 0 | 3 |   |   |
| 1 | 3 |   |   |   |   |   | 1 | 4 |   | 0 | 7 |   |   | 1 | 5 |   | 1 | 7 |   |   | 1 | 6 |   | 1 | 6 |   |   |
|   |   |   |   |   |   |   |   |   |   |   |   |   |   |   |   |   |   |   |   |   |   |   |   |   |   |   |   |
| P |   |   |   |   |   |   |   |   |   |   |   |   |   |   |   |   |   |   |   |   |   |   |   |   |   |   |   |

FIG. 4

| I | D | X |   | P | R | O | G | R | A | M |   | N | O |   | M | A | C | H | I | N | E |   | E | N | A | B | L | E | D |
|---|---|---|---|---|---|---|---|---|---|---|---|---|---|---|---|---|---|---|---|---|---|---|---|---|---|---|---|---|---|
| 0 | 1 |   |   |   | 1 | 0 | 0 | 2 | 5 | 0 | 0 | 1 |   |   | 1 |   | 2 |   |   |   |   |   |   |   |   |   |   |   |   |
| 0 | 2 |   |   |   | 2 | 0 | 0 | 2 | 5 | 0 | 0 | 1 |   |   | 1 |   | 2 |   |   |   |   |   |   |   |   |   |   |   |   |
| 0 | 3 |   |   |   | 1 | 2 | 3 | 4 | 5 | 6 | 7 | 8 |   |   | 1 |   |   |   |   |   |   |   |   |   |   |   |   |   |   |
| 0 | 4 |   |   |   | 2 | 2 | 3 | 4 | 5 | 6 | 7 | 8 |   |   |   |   | 2 |   |   |   |   |   |   |   |   |   |   |   |   |
| 0 | 5 |   |   |   | 2 | 0 | 0 | 3 | 1 | 1 | 1 | 1 |   |   |   |   |   |   |   |   |   |   |   |   |   |   |   |   |   |
| 0 | 6 |   |   |   | 3 | 0 | 0 | 2 | 5 | 0 | 0 | 1 |   |   | 1 |   |   |   |   |   |   |   |   |   |   |   |   |   |   |
| S |   |   |   |   |   |   |   |   |   |   |   |   |   |   |   |   |   |   |   |   |   |   |   |   |   |   |   |   |   |

FIG. 5

| ST | | PA | | SC | | # | | #F | | PROG | | | | #S | | PROG | | | | MIN | |
|---|---|---|---|---|---|---|---|---|---|---|---|---|---|---|---|---|---|---|---|---|---|
| 9 | 1 | 0 | 1 | | 1 | 1 | | 1 | 0 | 0 | 2 | 5 | 0 | 0 | 1 | 2 | 0 | 0 | 2 | 1 | 0 | 0 | 1 | 1 | 2 | 0 |
| 9 | 2 | 1 | 0 | | 2 | 2 | | 1 | 2 | 3 | 4 | 5 | 6 | 7 | 8 | 2 | 2 | 3 | 4 | 5 | 6 | 7 | 8 | | | |
| 0 | 1 | 1 | 3 | ? | ? | 1 | | 2 | 0 | 0 | 3 | 1 | 1 | 1 | 1 | | | | | | | | | | | |
| 0 | 2 | 0 | 6 | 1 | 2 | 2 | | 1 | 2 | 3 | 4 | 5 | 6 | 7 | 8 | 2 | 2 | 3 | 4 | 5 | 6 | 7 | 8 | | | |
| 0 | 3 | 0 | 8 | ▓ | ▓ | 1 | | 1 | 0 | 6 | 2 | 5 | 0 | 0 | 1 | 2 | 0 | 0 | 2 | 5 | 0 | 0 | 1 | | | |
| 0 | 4 | 0 | 9 | * | * | 1 | | 3 | 0 | 0 | 2 | 5 | 0 | 0 | 1 | | | | | | | | | | | |

FIG. 6

SERVICE REQUEST TABLE

```
STATION = 04
PALLET  = 04
MACHINE = 01
SERVICE = M60
M60  QUE = MT1
M70  QUE = MT2
Q
```

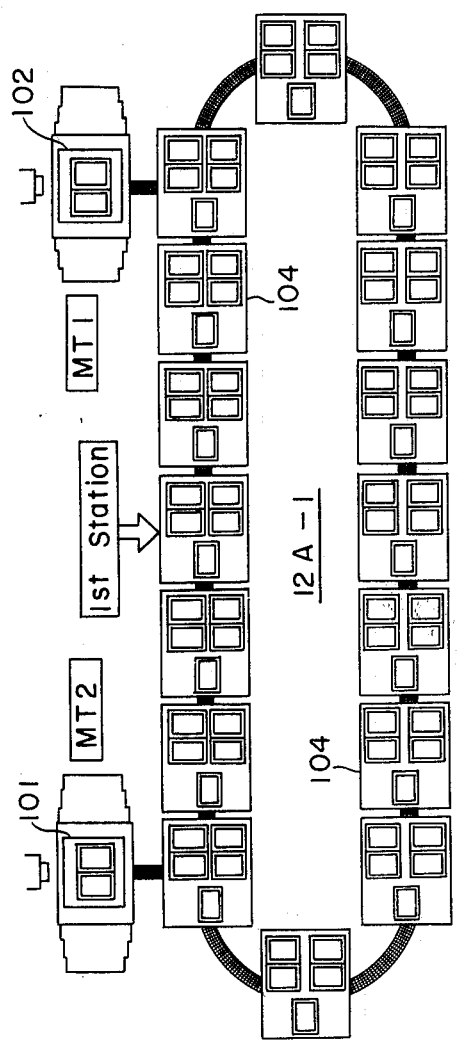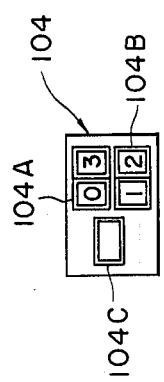

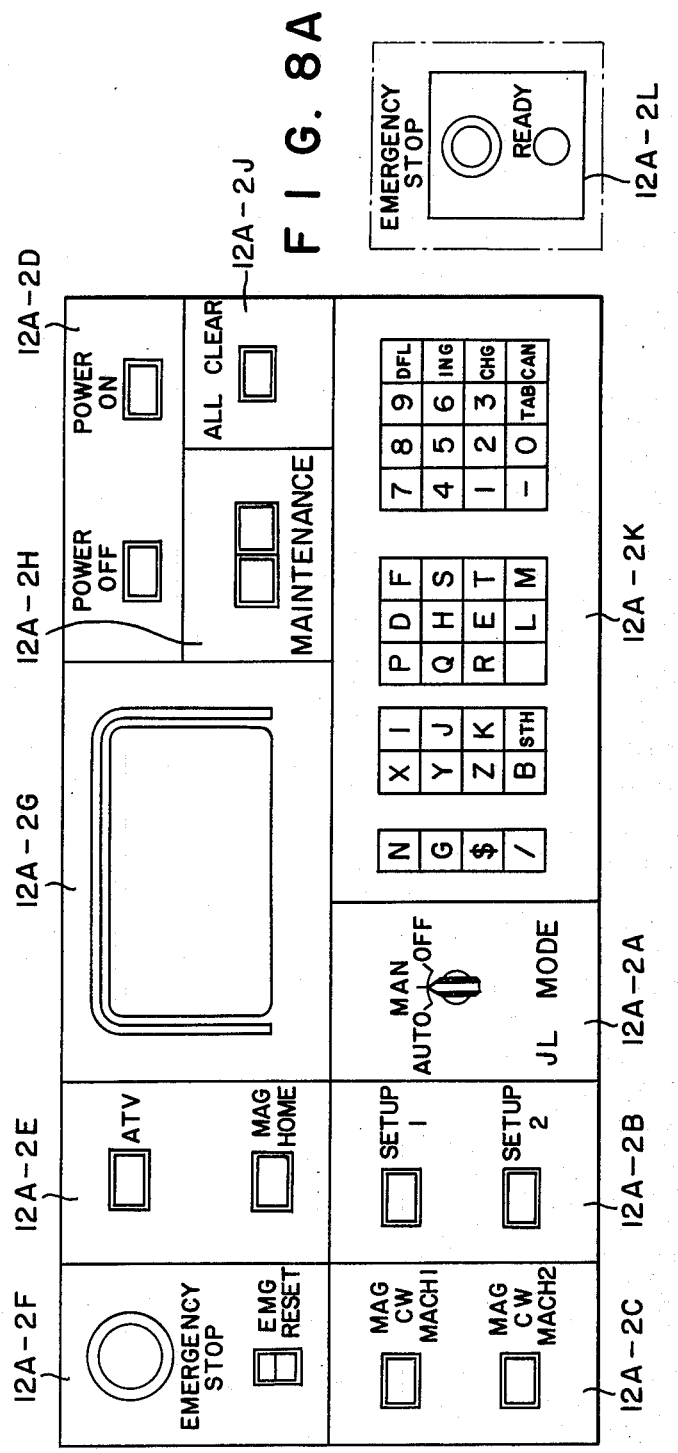

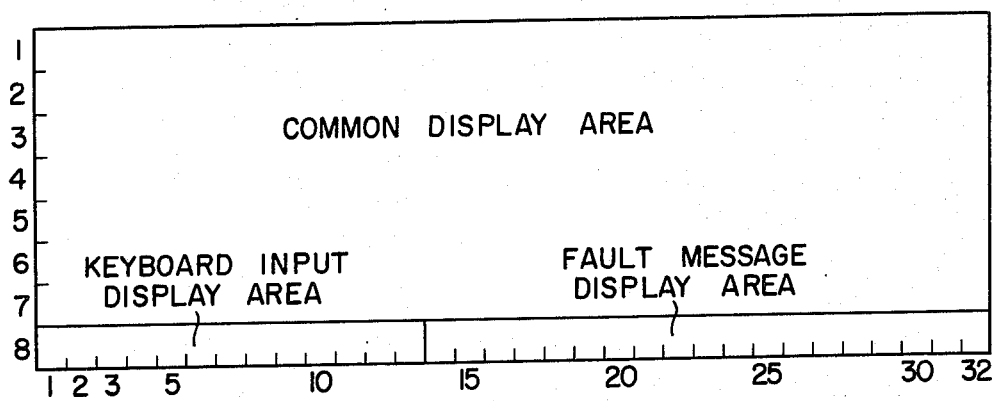

FIG. 13A

| | (1) SET # OF PALLET ON PALLET MAGAZINE | (2) TO MACHINE TOOL | (3) TO PALLET MAGAZINE | (4) TO MACHINE TOOL | (5) TO PALLET MAGAZINE | (6) TO MACHINE TOOL | (7) TO PALLET MAGAZINE |
|---|---|---|---|---|---|---|---|
| (A) EXCLUDED | BL | BL | | | | | COMPLETION BL (OR #1) |
| (B) 1st ONLY | #1 | #1 | COMPLETION #1 | | | | |
| (C) 2nd ONLY | #2 | #2 | COMPLETION BL (OR #1) | | | | |
| (D) 1st & 2nd | #1 | #1 | #2 | #2 | COMPLETION #1 | | |

FIG. 13B

| | (1) SET # OF PALLET ON MT | (2) TO PALLET MAGAZINE | (3) TO MACHINE TOOL | (4) TO PALLET MAGAZINE | (5) TO MACHINE TOOL | (6) TO PALLET MAGAZINE |
|---|---|---|---|---|---|---|
| (A) EXCLUDED | BL | #1 | #1 | #2 | #2 | COMPLETION BL (OR #1) |
| (B) 1st ONLY | #1 | COMPLETION #1 | | | | |
| (C) 2nd ONLY | #2 | COMPLETION BL (OR #1) | | | | |
| (D) 1st & 2nd | #1 | #2 | COMPLETION #1 | | | |

MACHINING SYSTEMS AND CONTROL SYSTEMS THEREFOR

BACKGROUND OF THE INVENTION

The present invention relates to a machineing system including a plurality of machining tools, and a control system useful for controlling the operation of the machining system.

Direct numerical control systems (which will be hereinafter referred to as DNC systems) have been known as typical systems for supplying various types of workpieces to a plurality of universal type machine tools such as machining centers. In such a system, a central computer processes all the information necessary for each machine tool, such as information about machining, information about tool exchange, and information about transfer of pallets carrying a workpiece into and out of the working area, and directly provides the movable members of the machine tool with numerical values representing the amount of the desired movement in the X, Y and Z axis directions. However, the DNC system generally is not economical unless there are about ten or more machine tools. Moreover, in a DNC system, the central computer is closely coupled with machine tools and workpiece conveyors, so that failure occurring in a part of the system, particularly in the central computer will disable operation of the entire system. Thus, adoption and operation of the DNC system require highly developed production control organization and computer software. For these reasons, various operation control systems for a plurality of machine tools which differ from the DNC systems have been proposed. One of them is a type wherein a numerical control device (which will be hereinafter referred to as an NC device) is provided for each of the machine tools, and separate operation of each machine tool is enabled.

In the afore-mentioned operation control system, various systems have been used, in place of the DNC system, for control over the conveyance of the pallets and transfer of pallets into and out of the working area of each machine tool. In a system which is frequently used, pallets are arranged for each machine tool in a predetermined order, and these pallets are sequentially supplied to the machine tool. In these systems, it is necessary to obtain data on various conditions such as: which pallet is in the pallet change position for each machine tool; whether or not the part program for the workpiece on the pallet is stored in the NC system; and whether or not instruction should be given to the pallet change device to introduce the pallet into the working area of the machine tool, and sequence operation for introducing the pallet must be carried out before execution of the part program. Control programs or instructions for various operations such as sequence operations on the conveyance of the pallets, and introduction of the pallet into the working area of each machine tool following an instruction for selecting the particular pallet are stored in a memory of a controller separately provided. But, even under these circumstances, programs supplementing the control program stored in the controller for driving the pallets are included in the system program in each NC device. According to a recent trend, a part program is made to contain instructions for selecting a pallet and for transferring the pallet. Provided at the pallet stop positions on the pallet conveyance line are sensing devices for locating the pallets.

The above-described is a problem of how to construct and how to drive the pallet magazine, and in a different viewpoint, a problem of how to control the pallet magazine in accordance with part of a part program or part of a system program in an NC device supplementing the control program. The part of the program concerning drive and contrl of the pallets in relation to transfer of pallets to and from the machine tool is referred to as a PA program.

Described hereinabove are mainly problems concerning conveyance line of the pallets and introduction and withdrawal of pallets.

In addition, there are problems associated with preparation of part programs. Tool numbers for identifying tools used for machining are designated in each part program and whether or not processes of "adaptive control" such as regulated feed rate control for targeted load should be performed for the particular tools is also specified in each part program. Whether or not program steps of tool breakage detection are adopted is also specified in each part program. Moreover, data concerning the diameter and the length of the tools necessary for path compensation and a code for calling such data from a different memory are specified in each part program. Incorporating these data and instructions concerning tools into a part program which already contains instructions concerning the specific pallets will add complication to preparation of the part program.

Preparation of a part program must, of course, be completed before the actual machining of the workpiece takes place.

It should also be noted that roles are usually divided between a programming department for preparing part programs and a machining department for manufacturing the product where machining on the workpieces actually takes place. It is with various difficulties for the programming department to prepare programs upon thorough understanding of various technical information and production control information which are known in the manufacture department. Decisions on the details such as whether or not the processes of tool breakage detection or adaptive control are to be adopted and how many spare tools should be stored in the tool magazine are difficult for the programmer to make and are better made by the operators in the manufacture department.

Moreover, in which order the workpieces on the respective pallets which may be as many as several tens in number should be machined by one or two machining centers and in what procedures the workpieces should be mounted on a pallet are matters of the nature to be decided by the manufacture department at its own convenience.

Having the programming department prepare a part program will lead to reduction of versatility or flexibility of the resultant program. For instance, if a machining center does not have a function of adaptive control such as regulated feed rate control for targeted load, a part program containing adaptive control instructions cannot be loaded in the NC device for use with the above-mentioned machining center. Also, a part program containing a process of detection of tool breakage cannot be loaded in an NC device which does not have a supervisory program for the tool breakage detection. Two examples have been raised in connection with the reduction of versatility of a part program. It will be understood from these examples that the versatility of a part program is progressively reduced (and hence a part program has to be re-prepared) as the various functions (tool breakage detection, adaptive control, tool radius compensation, tool length compensation, and the like) are added.

SUMMARY OF THE INVENTION

An object of the invention is to recover versatility of a part program.

Another object is to reduce complication in preparation of part programs.

According to the invention, there is provided a machining system including a plurality of machine tools each capable of performing, in a working area thereof, machining on a workpiece carried on a pallet, a pallet magazine system including a plurality of movable stations each capable of carrying and conveying a pallet and having a plurality of pallet change positions each associated with each of the machine tools, a plurality of pallet change devices each associated with each of the machine tools and each capable of transferring a pallet between the working area of the associated machine tool and the associated pallet change position, a plurality of numerical control devices each associated with each of the machine tools and each capable of storing part programs and of controlling the associated machine tool, and a system controller comprising:

first memory means for storing, in relation to each of schedule numbers indicating order of machining, an indicium of a pallet to be machined in the related order and an indicium of a part program to be used for machining the related pallet, and second memory means for storing, in relation to an indicium of each of the pallets, an indicium of the movable station carrying the related pallet.

BRIEF DESCRIPTION OF THE DRAWINGS

In the accompanying drawings:

FIG. 3 is a front view showing, partially, a display unit displaying, in the form of a table, part of the contents of a first memory device storing the correlation between stations and pallets;

FIG. 4 is a front view showing, partially, the display unit displaying, in the form of a table, part of the contents of a second memory device storing the correlation between part programs and numerical control systems storing the respective part program;

FIG. 5 is a front view showing, partially, the display unit displaying, in the form of a table, part of the contents of a third memory device storing, in relation to each pallet, order of machining (schedule number) and part program numbers;

FIG. 6 is a front view showing, partially, the display unit displaying a request from a machining center;

FIG. 7 is a front view showing, partially, a display panel of the system controller;

FIG. 7A is a diagrammatic representation of a display unit;

FIG. 8 is a front view showing, partially, a console panel of an input device of a system controller;

FIG. 8A is a front view showing, partially, an auxiliary console unit;

FIG. 9A is a schematic illustration showing allocation of various display areas of a display unit provided in the input device shown in FIG. 8;

FIG. 9B is a schematic illustration used for explaining how the data is inputted into the third memory device by means of keys;

FIGS. 9C and 9D are schematic illustrations showing part of the contents of the third memory device before and after the modification of the contents;

FIG. 13A is a schematic illustration showing change of contents of a space of the memory area which occurs when a workpiece in a pallet magazine system is machined first;

FIG. 13B is a schematic illustration showing change of contents of a space of the memory area which occurs when a workpiece in a machining center is machined first.

DESCRIPTION OF THE PREFERRED EMBODIMENTS

Noting that the tendency of a part program toward losing versatility or flexibility with the increase of functions in the machining center, and the added complication in preparing a part program are due to the fact that matters which ought to be dealt with in the manufacture department have been in fact dealt with in the programming department, the present inventors have developed a system with which a PA program is not handled by the NC device, the programmers need not be concerned with the data obtained in the manufacture department in the preparation of a part program, the information obtained in the manufacture department are eliminated from the machining program, and the information necessary for the particular machining is inputted in the manufacture department each time the need therefor arises.

With such an arrangement, preparation of a machining program is achieved only by specifying the fundamental matters such as amount of movement of the machine tool relative to the workpiece, feed rate, rotating speed, and the tool number. A part program thus prepared can be loaded in any machining center, that is it recovers versatility.

Figure 1:
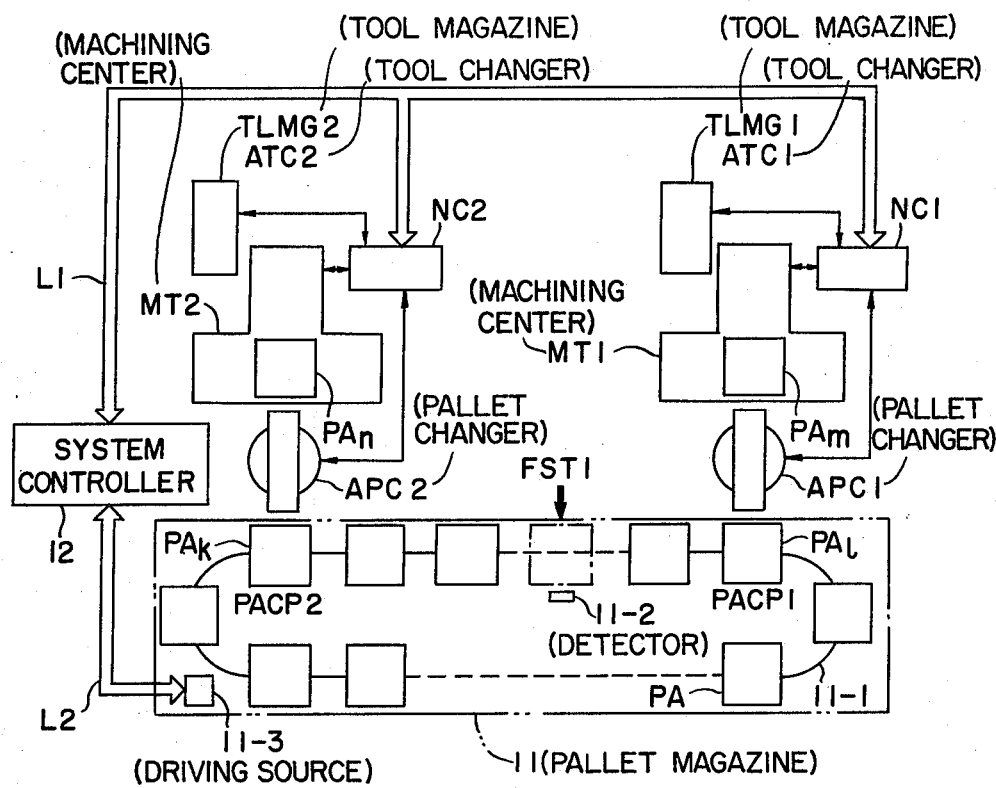
FIG. 1 is a block diagram showing the general construction of the overall machining system.

FIG. 1 shows an example of a machining system. Denoted by numeral 11 is a pallet magazine device (hereinafter referred to as a pallet magazine) in which a plurality of pallets PA are provided. Each pallet PA is carried on a pallet table, which is not shown and will be hereinafter referred to as movable station MVST, and is moved along a conveyance line 11-1.

The moveable stations MVST provided in the area of the pallet magazine 11 are constructed to enable accurate positioning at pallet change positions adjacent to pallet change devices (hereinafter referred to as pallet changers) APC1 and APC2, respectively associated with machining centers MT1 and MT2. In the state illustrated, pallets PA1 and PAk are respectively at the two pallet change positions. The pallet magazine 11 has a stationary station FST1 at a position indicated by a thick arrow. The stationary station FST1 serves as a reference point in determining correlation between the pallets PA and the group of movable stations MVST. More particularly, each movable station MVST(i) carries a pallet PA(j) (where i represents a movable station number designated to each movable station and i=1, 2, ... q, and j represents a pallet number designated to each pallet and j=1, 2, ... q-2.) It should be noted that each movable station does not necessarily carry a pallet of the identical number. The correlation between the numbers i of the movable stations and the numbers j of the pallets which are carried on the respective movable stations at the time when the first movable station MVST(1) is at the stationary station FST(1) will be used as an initial state of the correlation. In other words, the contents of a memory provided in the system controller 12 for storing the relationship between the moving station numbers and the pallet numbers is made effective, and the contents of the memory will be thereafter updated along with the mechanical movement of the movable stations in the pallet magazine 11. Denoted by numeral 11-2 is a detector detecting the first movable station MVST(1) for effecting the above-mntioned updating. The movabel stations are arranged in the order of their respective numbers, in the clockwise direction, for example. A driving device 11-3 drives the movable stations MVST in the clockwise or counter-clockwise direction, and for this purpose it receives instructions from the system controller 12 concerning the direction of the drive, i.e., clockwise or counter-clockwise direction, and the amount of movement in terms of the number of the movable stations which should pass the stationary stations FST1 for the desired amount of movement. Where the conveyance line 11-1 is in the form of a closed loop as illustrated, several drive mechanisms may be provided for dividing the drive of all the movable stations. A single conveyance line may be used where the conveyance line is linear.

The machining centers MT1 and MT2 are coupled to numerical control devices (hereinafter referred to as NC devices) NC1 and NC2 which numerically control the machining centers MT1 and MT2, as well as the tool magazines TLMG1 and TLMG2, and automatic tool changers ATC1 and ATC2. Carried on the tables constituting the working areas of the machining centers MT1 and MT2 are pallets PAm and PAn. When one step of machining on the workpiece, not shown, on the pallet PAm or PAn is completed, that pallet PAm or PAn is exchanged by the pallet changer APC1 or APC2 with the pallet PAl or PAk which is, at the instance, positioned at the pallet change position.

Each of the NC1 and NC2 is capable of storing a plurality of part programs, one of which is assigned or designated by the system controller 12 through a line L1.

For instance, where it is scheduled to commence machining on a workpiece on a pallet PAl by the machining center MT1 upon completion of machining on a workpiece on a pallet PAm, it is checked, by the system controller, before the commencement of machining on the workpiece on the pallet PAl, whether or not the part program PARTPRG (PAl) is stored in the NC1, and if it is found to be stored, the pallets are exchanged and the assigned part program PARTPRG(PAl), is executed to conduct the machining on the workpiece on the pallet PAl.

For the sake of brevity of explanation, a workpiece on a pallet PAx will hereinafter be identified by the identical reference code PAx as the pallet on which the workpiece is carried, and machining on a workpiece on a certain pallet PAx is sometimes referred to as machining on a pallet PAx.

Figure 2:
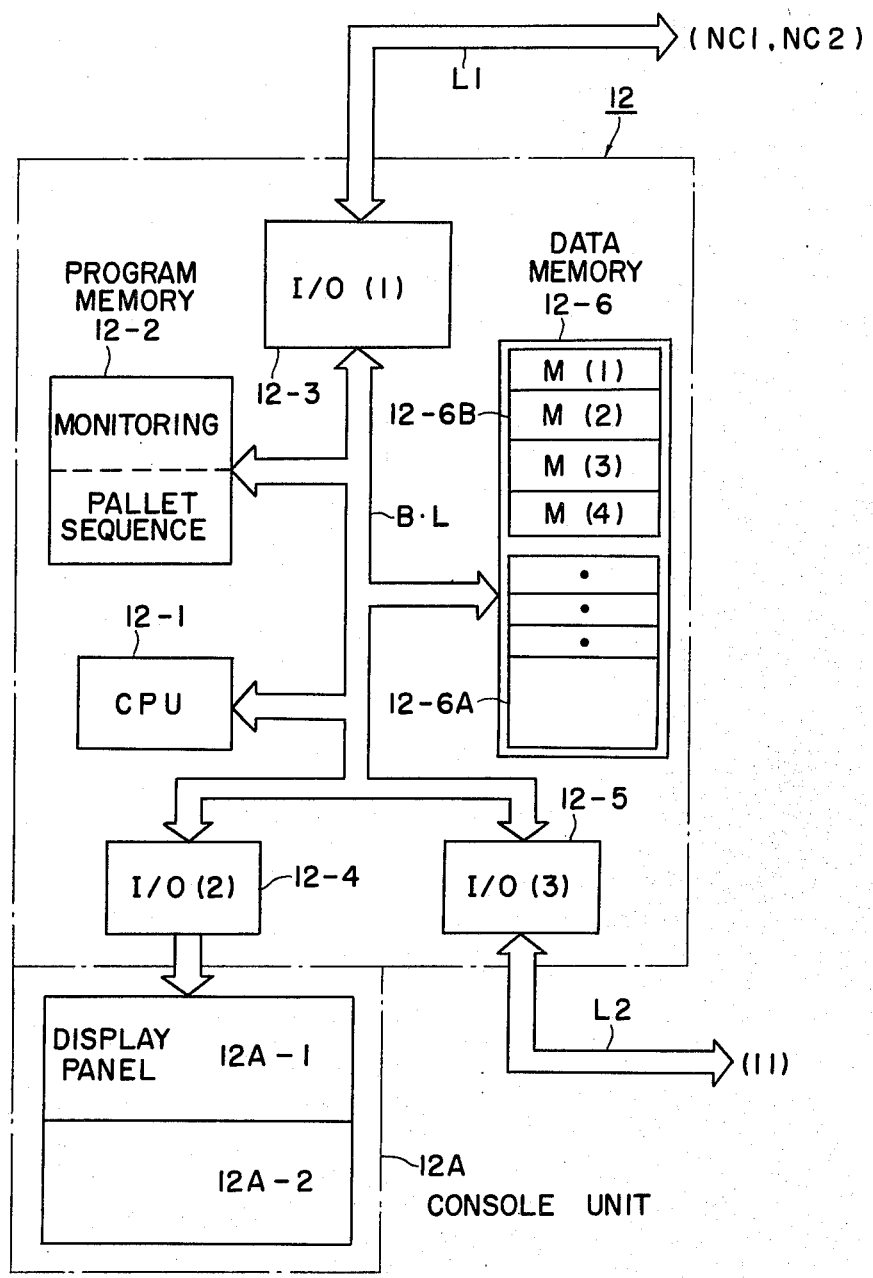
FIG. 2 is a block diagram showing the internal construction of a system controller.

FIG. 2 shows internal construction of an example of the system controller 12. This system controller 12 comprises a microcomputer. A program memory device 12-2 stores a system program used for monitoring the machining centers MT1 and MT2 and for sequence control of the pallet magazine. A central processing unit (CPU) 12-1 executes program steps of the system program using a bus line B.L. An I/O unit 12-3 is coupled through the line L1 to the NC1 and NC2. An I/O unit 12-4 is coupled to a console unit 12A, which includes, as will be described fully later, input keys, a display section and a display panel.

An I/O unit 12-5 is coupled through a line L2 to a detector 11-2 and a drive unit 11-3. A data memory device 12-6 temporarily stores numerical data and logic value signals which are necessary for execution by the CPU 12-1 of each step of a program stored in the program memory device 12-2. These numerical data and logic value signals are inputted by means of the I/O units 12-3, 12-4 and 12-5. The data memory device 12-6 includes a memory area for storing the results of operation by the CPU 12-1. In FIG. 2, for simplifying explanation, the data memory device 12-6 is shown to comprise a first data memory device 12-6A including registers for storing general data and a second data memory device 12-6B for storing data necessary for driving and controlling the pallet magazine 11.

The bus line B.L. is connected to the I/O units 12-3, 12-4, and 12-5, the memory devices 12-2 and 12-6, and the CPU 12-1.

Now, further explanation on the second data memory device 12-6B will be given.

The second data memory device 12-6B includes a first memory area M(1), which stores, in relation to an indicium or number of each movable station MVST, an indicium or number of the pallet PA carried on the related movable station. The contents of the first memory area M(1) can be displayed in the form of a table (first correlation table), as shown in FIG. 3.

In FIG. 3, the movable stations MVST are identified by ST, for brevity. The correlation is shown by the number i of each movable station and the number j of the corresponding pallet, the numbers i and j being two-digit decimal numbers. For instance, the movable station ST(01) and the pallet PA(13) correspond to each other. The tables in the working areas of the machining centers MT1 and MT2 are treated in the same way as the movable stations, and are identified by ST(91) and ST(92). The spaces for the pallet numbers corresponding to the movable station numbers ST(13) and ST(11) are not filled. This indicates that no pallets are carried, at the instance in question, on those movable stations.

Formation of the correlation table shown in FIG. 3 can be achieved by inputting, by the use of input keys provided on the console unit 12A of the system controller 12 and through the I/O unit 12-4, the number of each movable station and the number of the pallet carried on the movable station. For instance, pallets are mounted, at will, on movable stations, and when the first movable station ST(1) is positioned at the stationary station FST1, the operator observes the number of the pallet which is at the instance carried on the movable station ST(1) as well as the numbers of other pallets which are respectively on the movable stations. The movable stations are numbered in the order of their positions, in clockwise or counter-clockwise direction. The observed pallet numbers are inputted in relation to the movable station numbers. In this way, initial data are given to the correlation table.

Each time the pallets are exchanged by the automatic pallet changer APC1 or APC2, the contents of the correlation table are partially rewritten and the correlation table is thereby updated.

The second data memory device 12-6B also includes a second memory area M(2), which stores, in relation to an indicium or number of each of the part programs, one or more indicia of the NC devices storing the related part program, or of the associated machining centers. The contents of the memory area M(2) can be also displayed, partially at a time, in the form of a table, as shown in FIG. 4.

The displayed table contains the numbers of the part programs PROGRAM NO and the spaces in which the one or two numbers of the machining centers MT1 and MT2 are written against the corresponding program numbers. For instance, at the row for INDEX NO. 1, the space adjacent to the part program number is filled with the machining center numbers 1 and 2. This indicates that the part program No. 10025001 in that row is stored and can be used by both the NC devices NC1 and NC2.

The second data memory device 12-6B further includes a third memory area M(3), which stores, in relation to each schedule number indicating priority or order of machining (which will be hereinafter referred to as schedule), an indicium of a pallet carrying a workpiece to be machined in the related order and an indicium or number of the movable station carrying the related pallet, indicia or numbers of part programs to be used for machining on the related pallet, an indicium indicating which of the two related part programs should be used first, and a code indicating the waiting time to be spent after machining according to one of the related part programs is completed and before machining according to the other related part program is commenced. The contents of the third memory area can be displayed, partially at a time, in the form of a table, as shown in FIG. 5.

In the displayed table, each of the spaces under the heading of ST is filled with a number of a movable station. Each of the spaces under the heading of PA is filled with a number of a pallet. Each of spaces under the heading of SC is filled with a schedule number or one of marks "?" "*" and " ". Each of the spaces under the heading of # is filled with a code "1" or "2", significance of which will be apparent from the following description. Each of the spaces under the heading of #F PROG is filled with a first one of the part programs to be used for machining the pallet identified by the number in the same row. Each of the spaces under the heading of #S PROG is filled with a second one of the part programs to be used for machining the pallet identified by the number in the same row. Some of the spaces under #S PROG are blank. This means the second one of the part programs is not specified for the related pallet, because, for instance, only a single machining step is left for the related pallet. Spaces under MIN are filled with a number indicating the waiting time or are blank when such no waiting time is required. The above-mentioned code "1" or "2" under # indicates which of the part programs identified by the numbers under #F PROG and #S PROG should be used first. When the code "1" is entered, the part program identified by the number under #F PROG is to be used first. When the code "2" is entered, the part program identified by the number under #S PROG is to be used first.

Assume, for instance, when the schedule of the highest priority, i.e., the schedule SC=1 is designated, the corresponding pallet PA=01 is on the table of the machining center MT1 identified by the station number ST=91. The machining step number #=1 indicates that the machining according to the first part program #F PROG=10025001 should be made first. MIN=120 specifies that the machining step according to the second part program #S PROG=20021001 should not be commenced until 120 minutes after the completion of the machining step according to the first part program #F PROG.

In the row with the schedule number SC=2, 2 is placed under #, so that the machining step according to the second part program #S PROG=22345678 is made first. No waiting time is necessary after the completion of the machining according to the second part program #S PROG before machining according to the first part program #F PROG=12345678.

As was mentioned above, some of the spaces for the schedule SC are filled with marks "*", "?" and " ". The mark * indicates that some abnormality in machining has occurred on the particular workpiece so that the workpiece should be returned to the pallet magazine 11.

The mark ? indicates that the part program to be used for machining on the particular workpiece is not stored in the NC1 and NC2.

The mark     is formed by turning on all the plasma display elements (e.g. discharge volumes or sites) in the particular space and it indicates that the machining has been properly completed (if the designation has been made up to the second step, it indicates that the machining has been properly completed up to the second step). The SC spaces kept blank signifies that the particular workpiece should be excluded from the scheduled operation.

As mentioned above, according to the invention, the marks *, ? and    are written in the SC column and only those pallets having the corresponding SC spaces filled with a schedule number can be designated, and the schedule numbers are deleted from the SC spaces corresponding to the pallets which should be excluded from the schedule operation (because, for instance, of completion of machining). It is noted at this juncture that the arrangement may alternatively be such that the marks *, ? and     or alternative codes are written in a different column.

The second data memory device 12-6B further comprises a fourth memory area M(4), whose contents are determined responsive to request from the NC1 and the NC2 and can also be displayed in the form of a table as shown in FIG. 6. The contents as depicted in FIG. 6 have the following meanings.

(a) The pallet PA=04 on the movable station ST=04 is to be exchanged by the pallet changer associated with the MT1. (b) An M60 instruction or an M60 queue (pallet change instruction) has been given from the NC1 associated with the MT1. (c) An M70 instruction or an M70 queue (NEAR PROGRAM END instruction) signifying that the machining step is nearly completed has been given from the NT2 associated with the MT2. The request table may, for instance, have the illustrated contents in a situation where the pallets and the movable stations are in the positions as illustrated in FIG. 1, i.e., the machining step on the pallet PAm has been completed and the M60 instruction (described in the final part of the part program block) signal is given, the pallet PA1=PA04 is in the pallet change position of the APC1 for the next schedule, the pallet PA1=PA04 is on the movable station MVST(04), and an M70 instruction is given from the NT2 associated with the MT2 and the fact that the completion of the machining step is close is indicated.

Details of the console unit 12A shown in FIG. 2 will now be described.

The console unit 12A includes a display panel 12A-1 including a display unit for displaying the correlation between the pallets and the movable stations in the pallet magazine and an input device 12A-2 including an input key board for inputting data into the memory areas M(1), M(2), M(3) and the like.

FIG. 7 is a front view of the above-mentioned display panel, which has a layout simulating the arrangement of the pallets and movable stations in the pallet magazine 11 and the machining centers MT1 and MT2. The display units 101 and 102 for the machining centers MT1 and MT2 display two-digit decimal numbers of the pallets respectively placed in the machining centers MT1 and MT2.

Display units 104 are arranged along a loop similar to the conveyance line. The number of these display units is equal to that of the movable stations. As shown in FIG. 7A, each of the display units includes a pallet number display area 104A in the upper right portion and a movable station display area 104B in the lower right portion. The display areas 104A and 104B will be referred to as a first display portion. In FIG. 7A, the first display portion (104A, 104B) indicates that the pallet PA03 is carried on the movable station MVST12. A second display portion 104C on the left side has two states, namely on and off of the lamp provided therein. When the lamp is on, it indicates that the machining on the workpiece, PA03 for instance, is completed. When the lamp is off, indicates that the machining is not completed.

Observation of the first and the second display portions will enable the operator to identify the workpieces whose machining is over.

The above-mentioned second display portion is combined with a pushbutton switch which the operator may depress to turn its lamp on and to exclude the workpiece from the machining schedule. When the pushbutton switch is depressed again, its lamp is turned off and the exclusion is terminated. Normally, when the setting of the workpiece on the pallet is completed and before the operation is commenced the display portion 104C is in the off state.

FIG. 8 is a front view of the input device 12A having an input keyboard.

A selection switch 12A-2A enables selection of operation mode or job list mode (JL MODE) of the system controller 12, between automatic operation (AUTO), manual operation (MAN) and no operation (OFF).

When the JL-AUTO is selected, schedule operation is performed. In the schedule operation, the system controller 12 is responsive to the various data shown in FIGS. 3-5 and supplied pallets PA to the machining centers MT1 and MT2, assigns part programs for the NC1 and NC2 and causes the machining centers to operate automatically. A pallet change instruction i.e., an M60 instruction is provided in each part program. For operation of each machining center for the first time, it is only necessary that M60 instruction is given by manual data input (MDI). When cutting abnormality is detected in one of the machining centers during automatic operation under JL-AUTO, the system controller 12, responsive to the abnormality detection signal, gives instructions to cause retraction (retract cycle) of the workpiece under the cutting, and change of the pallet (For this to be achieved, the NC device stores the retract cycle program.) The system controller further gives instructions for assigning the part program for the next workpiece and causing start of operation.

The sequence operation programs for the retract cycle annd the pallet change are also stored in the NC systems, but the manner in which the system controller 12 assigns the sequence operation program is identical to that used for assigning the part program.

History of the workpiece, such as proper completion of the machining, occurrence of cutting abnormality or completion of the first step is stored in the memory area M(3).

During schedule operation (JL-AUTO), pallet change is performed in the following manner. (a) when a pallet change instruction M60 is given from an NCi (i=1 or 2) to the system controller 12, the pallet having the highest priority at that instance is brought to the pallet change position for the machining center MTi. If an M70 (NEAR PROGRAM END) instruction is first given from the NCi the pallet is similarly designated and brought to the pallet change position. If an M60 instruction is given from an NCi after the other numerical control device NCj (j=2 or 1) has given an M70 instructions but has not completed the machining, the M60 instruction is given priority.

(b) Priority of machining is given to the following pallet, in the following order.

(1) The pallet which has the lowest schedule number SC and which has not been machined.

(2) The pallet which has the lowest schedule number SC, associated with a pallet change position for a machining center MTi in which the required part program is not stored, and which has not been machined.

(3) That on which the first machining step is completed and on which the waiting time has passed. (Where there are more than one of them, the one having the lowest schedule number SC is given priority.)

The pallet change instruction M60 and the NEAR PROGRAM END instruction M70 have the following relationship in connection with the operation of the system controller.

(a) By having an M70 instruction set near the end of a part program, pallet selection (positioning of the selected pallet to the pallet change position) can be effected before the end of the machining.

(b) If an M70 instruction is not set in a part program, an M60 instruction causes pallet selection and thereafter pallet change is effected under the sequence control by the NCi.

(c) If an M70 instruction is given from NCi during machining by MTi and an M60 instruction is given from NCj before completion of the machining by MTi, pallet selection and pallet change for MTj is given priority. A service for MTi is effected afterwards.

(d) If the an M70 instruction is given from NCi after an M70 instruction is given from NCj and pallet selection and pallet positioning are completed, the later given instruction will be made in waiting "state". But, after that, pallet service responsive to the NC device that has given an M60 instruction earlier is given priority. In other words, if an NC device has given an M70 instruction later, has been in waiting state, but has given an M60 instruction earlier, then that NC device will be given priority in pallet change.

When JL-AUTO mode is selected, in order to shorten the time and the length of movement for bringing the selected pallet to the pallet change position, the pallets and the movable stations are rotated generally in either of the directions (clockwide and counter-clockwise) which results in shorter travel. Also, to increase the accuracy of positioning, the final positioning is effected by having the pallets and the movable station rotate in a specified (clockwise, for instance) direction. Thus, if a counterclockwise rotation is adopted for bringing the pallets to the pallet change position, the pallet is made to rotate a little over the pallet change position, and then rotated in the opposite (clockwise) direction to be accurately positioned to the pallet change position. Such a procedure will eliminate the effects of backlash or play of the pallet magazine 11.

Assume now the JL-MAN mode is selected by means of the selector switch. In the JL-MAN mode, the pallets are manually indexed to the pallet change positions for the machining centers independently of the schedule numbers. Operations are otherwise identical as in the JL-AUTO mode. Manually indexing the pallets may be considered a manual interrupt during the JL-AUTO mode operation. The JL-MAN mode may for example be used when the pallet magazine 11 is desired to be temporarily operated by the operator for replacing the pallet after completion of the machining on the pallet. Automatic pallet indexing is not effected in the JL-MAN mode.

As was mentioned above, when the pallet is manually indexed for the machining center MTi, and if the number of the part program for the pallet is registered in the system controller 12 (by reference to the memory area M(2) in FIG. 4), and hence the corresponding part program is stored in the corresponding NCi, inputting an M60 instruction by MDI (MANUAL DATA INPUT) will cause pallet change and assignment of an automatic part program and starting of the machining center MTi.

History on the machining thus started is handled and stored in the same way as in the Jl-AUTO mode.

In the JL-MAN mode, if cutting abnormally occurs in the machining center MTi, retract cycle operation is performed. If, in such a state, the pallet in the pallet change position PACPi for the machining center MIi, and various conditions such as presence of the part program are fulfilled, then pallet change cycle is performed and machining on the pallet is commenced. However, if machining is completed, or cutting abnormality occurs, or the required part program is not stored (these data are stored in the SC spaces of the memory area M(3) in FIG. 5), then the M60 instruction from NCi and cycle stop state is resulted in, and one of the set up lamps (SET UP 1 and SET UP 2) provided in the panel area 12A-2B (FIG. 8) of the system controller 12 is turned off.

In such a case, the required pallet is manually indexed to the pallet change position PACPi, one of the set up buttons is thereafter depressed, and the cycle start push button is depressed. When such operations are effected by the operator, pallet change is performed and machining on the new pallet is commenced.

Assume now the selection switch 12A-2A is set to the JL-OFF mode. In the JL-off mode, schedule operation as in the JL-AUTO mode and the JL-MAN mode cannot be performed. Therefore, the pallet is manually indexed to the pallet change position PACP for the machining center, and thereafter an M60 instruction is given by MDI. By doing so, pallet change cycle is performed. If a part program for the pallet is stored in the NCi, the part program number is selected by MDI and memory operation is commenced. Where the required part program is not stored in the NCi in advance, the part program may be inputted into the memory of the NCi before starting the memory operation or a tape reader may be used to read a tape storing the part program.

When machining is completed, indication of completion of machining, renewal of the memory areas (M(1), M(2), M(3)) and the like are not performed. When cutting abnormality has occurred, change to the retract cycle is not carried out, and the state is brought to a cycle stop wherein the system is kept stopped.

In FIG. 8, the area 12A-2C on the input device 12A-2 is provided to move the pallets on the pallet magazine 11 in the clockwise direction to index the pallet to PACP1 for MACH1 or PACP2 for MACH2. When a pushbutton MAG CW MACH1 in the area 12A-2C on the panel is depressed, a lamp in the pushbutton is turned on. After that, depressing the pushbutton whose lamp is on will lead to turn-off of the lamp, and upon completion of indexing for the corresponding machine tool (MAG CW MACH 1 → MT1 MAG CW MACH 2 → MT2), the pushbutton's lamp is turned on again to indicate that the indexing is completed for the particular MIi.

The operator can therefore, through observation of the pushbuttons and the pallet positions on the display panel 12A-1, index the pallet to either PACPi. The pushbutton is depressed when the required pallet has reached the position right in front on the PACPi.

Provided in the area 12A-2D on the input device in FIG. 8 are pushbuttons for POWER ON and POWER OFF of the system controller 12. When the POWER ON pusbutton is depressed, power is supplied to the system controller 12 and the drive unit 11-3 (for instance a hydraulic unit) is energized. In this state, EMERGENCY STOP button is illuminated in the panel area 12A-2F, and depressing EMG RESET pushbutton will release EMERGENCY state.

To turn off the power supply, EMERGENCY STOP state is brought about and POWER OFF pushbutton is depressed. As this is done, POWER ON lamp is turned off and the POWER OFF state is brought about and a red POWER OFF lamp is turned on. After this state, a lever switch of a circuit breaker is operated for disconnecting the system controller 12 from the power supply line. When the EMERGENCY STOP button in the panel area 12A-2F is depressed, the pallet magazine 11 is promptly stopped. However, the sequence logic in the system controller 12 is retained so that operation can be resumed when the EMG RESET pushbutton is depressed. In resuming the operation, synchronism is checked, so that selection of the desired pallet is resumed after passing over the first station FST1.

If the ALL CLEAR pushbutton in the panel area 12A-2J is depressed while in the EMERGENCY STOP, the sequence logic is cleared. The EMG RESET pushbutton serves to terminate an emergency stop state, and is used when connection to the power supply prior to the commencement of the operation is made or the operation is resumed after depression of the EMERGENCY STOP pushbutton. When some fault occurs during operation, the ATN (ATTENTION) pushbutton in the area 12A-2E is intermittently illuminated and a fault message is displayed in the data display area 12A-2G. Depression of the ATN pushbutton after removal of the cause of the fault will cause turn-off of the ATN's lamp and disappearance of the fault message. MAG HOME pushbutton is used to give an instruction for synchronization of the memory areas M(1) and M(3) and the pallets at the first station FST1 (see FIG. 1).

Input of data into the memory area (FIG. 3) storing the correlation between the station numbers and the pallet numbers is achieved by operating the keys in the panel area 12A-2K, and then MAG HOME pushbutton is depressed in JL-OFF mode. Then, the pallet magazine 11 is driven in the clockwise direction and is stopped after indexing of the first station FST1. At the same time, synchronization with the contents of the memory area M(1), i.e., the ST-PA table of FIG. 3 is taken. If the synchronization is taken, a message to that effect is displayed.

The MAG HOME pushbutton is effective only in the JL-OFF mode. Before effecting pallet change in JL-OFF mode, whether or not mounting of a workpiece on each pallet, i.e., "preparation" is completed is checked. For this purpose, SET UP 1 pushbutton and SET UP 2 pushbutton are provided in the panel area 12A-2B, respectively in association with MACH 1 and MACH 2. Where an M60 instruction is given from the NC device in JL-OFF mode, and if the SET UP pushbutton is depressed, its lamp is on and pallet change is commenced. If the SET UP pushbutton is not depressed, a message to that effect is displayed and pallet change is not effected.

In the JL-AUTO mode or the JL-MAN mode, the schedule operation automatically establishes the condition of SET UP 1 or SET UP 2. The ALL CLEAR pushbutton in the panel area 12A-2J is used to clear the sequence of the pallet magazine 11 and to clear the request signal from the NC device. This pushbutton is made effective when the pallet magazine 11 is in the JL-OFF mode or the system controller 12 is in the EMERGENCY STOP state.

Depression of the MAINTENANCE pushbutton in the panel area 12A-2H will cause the system controller 12 to be in the EMERGENCY STOP state and to permit internal inspection. The MAINTENANCE pushbutton is used for inspection and maintenance.

Shown in FIG. 8A is a READY pushbutton provided on an auxiliary console unit positioned adjacent to a door entrance of the pallet magazine 11.

Unless the READY pushbutton has been depressed, the pallet magazine system 11 cannot be operated irrespective of the mode of JL. Thus, the READY pushbutton serves to ensure safety of the system.

Normally, the READY pushbutton is depressed after the POWER ON pushbutton and the EMG RESET pushbutton are depressed.

If the state of the system is changed from READY ON to READY OFF state while the pallet magazine 11 is in the course of an operation, it will be stopped after completion of the operation, and it will not be restarted until the next READY ON state.

If such change occurs while the pallet magazine 11 is not in the course of an operation, it will not begin a new operation even if an instruction for an operation is given.

After the state is changed to READY OFF, subsequent change to READY ON will not be effected unless the operator depresses the READY pushbutton.

During READY OFF state, a message indicating thereof is displayed.

When an operator opens a door for entering inside a safety barrier of the pallet magazine 11, an interlock mechanism acts to make the change into READY OFF state.

The panel area 12A-2G is a data display and is capable of displaying 32 characters in each of 8 lines, i.e., 256 characters in all. The display unit may for instance comprise a plasma display unit.

The display area in the data display unit 12A-2G is divided, as illustrated, into a common display area, a keyboard input display unit and a fault message area. The common display area is used to display the contents of the memory areas M(1), M(2), M(3) and M(4) in the form of tables as shown in FIGS. 3, 4, 5 and 6. The keyboard input display area is used to display addresses and numerical data inputted by means of the key input device. The fault message display unit is used to display fault code and a message.

Displaying, forming and modifying the memory tables by operating the input keys are made in the following manner. As an example, explanation will be given with reference to the memory area M(3). Other tables are displayed, formed and modified in a similar manner.

First, the procedure for effecting display of the contents of the memory area M(3) (the schedule table) will be explained.

Display can be effected in any of the JL-AUTO, JL-MAN and JL-OFF modes.

(1) When key "P" among the input keys is depressed, a first table portion consisting of rows for ST91, ST92, ST01, ST02, ST03 and ST04 is displayed.

(2) After that, when key "TAB" is depressed, a second table portion consisting of rows for ST05, ST06, ST07, ST08, ST09 and ST10 is displayed.

(3) After that, when key "TAB" is depressed again, a third table portion consisting of rows for ST11, ST12, ST13, ST14, ST15 and ST16 is displayed.

(4) After that, when key "TAB" is depressed again the first table portion is displayed.

Thereafter, the steps (2), (3) and (4) can be repeated.

FIG. 9B shows one row for ST02 of the table formed of the contents of the memory area M(3).

Now, the procedure for inputting schedule data will be described.

(1) The operation mode is switched to JL-OFF mode.

(2) When key "P" is depressed the first table portion is displayed.

(3) Then keys "m" and "n" are depressed, and key "TAB" is depressed. With these operations done, a two-digit numeral corresponding to the pallet number is inputted and displayed in the key input display area becomes "PmnSC". "SC" in the final portion signifies that the schedule number is to be inputted next.

Assume that the schedule number is 3, that the first machining step is conducted first, that the part program number of the first machining step is 12345678, that the part program number of the second machining step is 22345678, and that the waiting time between the first and the second steps is 100 minutes. The data reflecting the above-mentioned situation are inputted in the following way.

(4) Following the step (3), keys "3" and "TAB" are depressed. As this is done, the display becomes "PmnSC#".

(5) The keys "1" and "TAB" are depressed and the display becomes "Pmn#F".

(6) The number "12345678" is inputted by depressing the keys "1", "2", "3", . . . "8" in turn and the key "TAB". The display becomes Pmn#S.

(7) The number "22345678" is inputted by depressing key "2" twice, and keys "3", "4", . . . "8" and the key "TAB" are depressed. The displays become "PmnMN".

(8) The waiting time "100 minutes" is inputted by depressing key "1", and depressing key "0" twice, and depressing key "TAB". The display then becomes Pmn+1 and the next pallet number id designated.

(9) Thereafter, the steps (3)–(8) can be repeated.

The procedure for changing and modifying the schedule data is now described.

Assume that the data shown in FIG. 9C are to be changed to the data shown in FIG. 9D.

Changing the data involves deleting the old data and inputting new data. Deleting the old data consists of inputting zeros. This can be accomplished in a manner similar to that described above at the steps (1)–(9).

(1) The operation mode is switched to JL-OFF.

(2) Keys "P", "0", "9" and "TAB" are depressed. The display becomes "P09SC".

(3) Key "1" is depressed twice and key "TAB" is depressed. When this is done, SC03 is cancelled and SC11 is moved to the row which has been occupied by SC03, and the display becomes "P09#". Also, SC12, SC13, SC14, . . . are respectively moved to the rows which have been occupied by SC11, SC12, SC13, . . . .

(4) Keys "2" and "TAB" are depressed. As this is done, the steps #1 and #2 are changed, and the display becomes "P09#F".

(5) Key "1" is depressed four times, and key "2" is depressed four times and then key "TAB" is depressed. Then "#F12345678" is changed to "#F11112222", and the display becomes "P09#S".

(6) Key "TAB" is depressed. "#S22345678" in FIG. 9C is left unchanged, and the display becomes "P09MN".

(7) Keys "5", "0" and "TAB" are depressed. "MN100" is changed to "MN50", and the display becomes "P". Blank after "P" signifies the completion of the modifying operation.

(8) This concludes the procedure. When another change is desired, the pallet number on which the change is desired, is entered and key "TAB" is depressed as in the step (2) above. The succeeding steps are similar to those described above.

Figure 10:
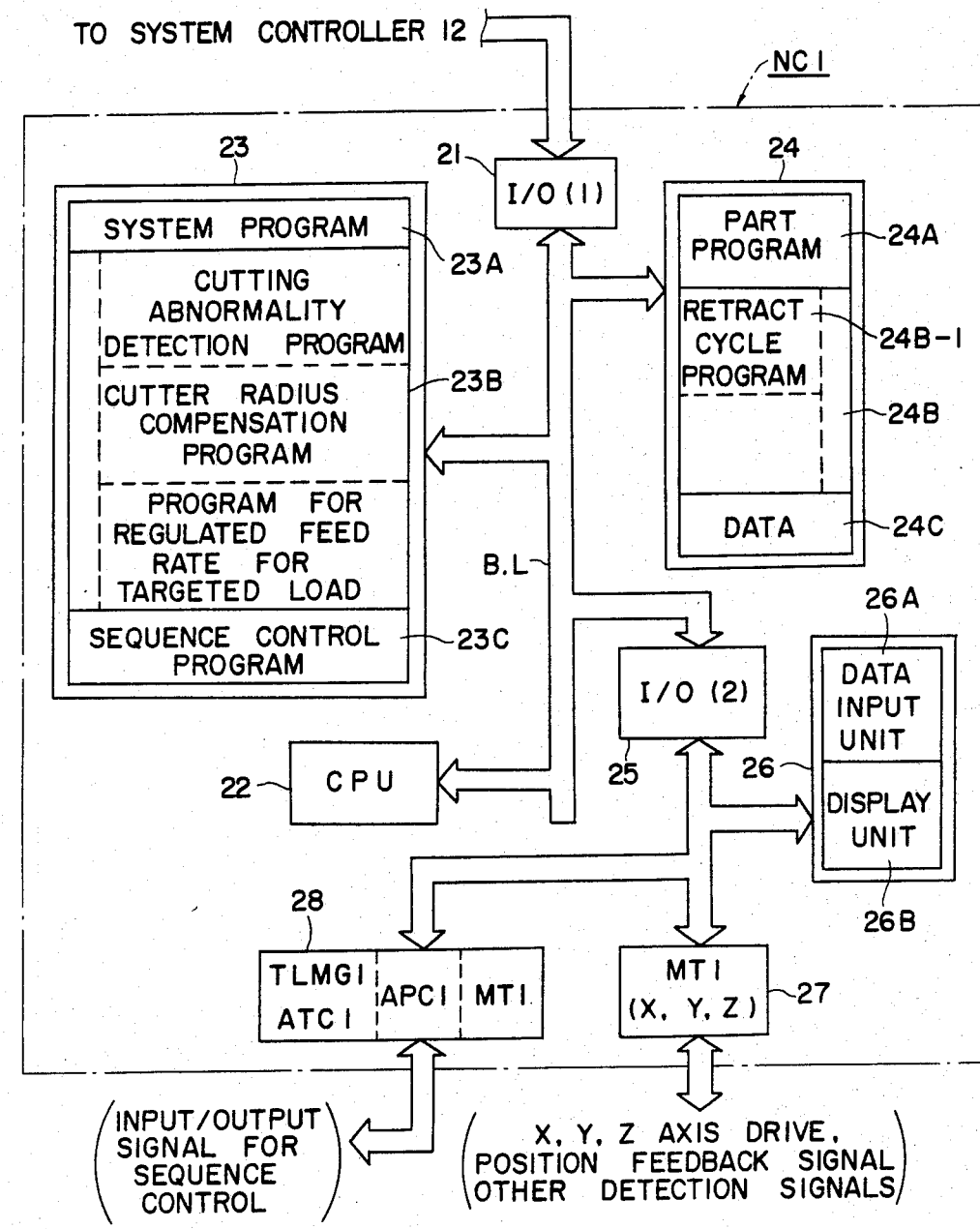
FIG. 10 is a block diagram showing the internal construction of a numerical control system.

FIG. 10 shows a block diagram showing part of the NC1. (The NC2 has a similar construction, so that explanation thereof will be omitted.) The NC device is in the form of a CNC (computerized NC) wherein a central processing unit (hereinafter referred to as CPU) 22, I/O units 21, 25, a program memory 23 and a data memory device 24 are coupled together by means of a bus line B.L.

The I/O unit 21 is coupled to the system controller 12. The I/O unit 25 is coupled to a console panel unit 26 of NC1. The unit 26 has a display unit 26B for displaying various signals and a data input unit 26A for setting various conditions concerning the tools specified by pushbuttons for MDI and the part programs (whether or not cutting abnormality detection is performed; whether or not adaptive control is performed; and whether or not cutter radius (length) compensation is (performed) and numerical data associated with the conditions. The I/O unit 25 is also coupled to a drive unit 27 (including a feedback signal input device) for the driving servo motors of X, Y and Z axes of the machining centers MT1, and to an I/O unit 28 concerning the sequence operation of the machining center MT1, the pallet change device APC1, the tool magazine TLMG1 and the automatic tool changer.

The CPU22 reads the program steps in the program memory 23 through the bus line B.L. and executes them.

Stored in the program memory 23 are a system program 23A for controlling, in association with the part program 24A in the data memory 24, the NC system NC1 and hence the CPU22, a sequence program 23C forming branches of the system program 23A, and control programs 23B for executing additional functions such as cutting abnormality detection, cutter radius (or length) compensation, and regulated feed rate control for targeted load (adaptive control).

Whether or not each of the control program 23B is adopted in the system program 23A is determined by means of the data input unit 26A of the console panel unit 26.

Provided in the data memory device 24 are the part programs 24A corresponding to machining steps to be performed on various workpieces, data programs 24B for instructing a series of axial movements of the machining center MT1. One of the data programs 24B is a retract operation program 24B-1 for giving instructions for axial movement to effect retract cycle operation of the machining center MT1 upon detection of abnormality such as tool breakage during execution of the tool abnormality detection program which is one of the control programs 23B. The retract cycle operation may for example consist of separating the tool mounted on the spindle from the workpiece and transferring the pallet to the pallet change position.

Also provided in the data memory device 24A is a DATA area for temporarily storing logic signals corresponding to the states of ON and OFF of various switches in the setting device 26A, logic states of switches provided in MT1, APC1, ATC1, TLMG1 and the like, and signals specified by the system controller 12 (for example, a signal for assigning one of the part programs and a signal for driving the APC1).

Figure 11:
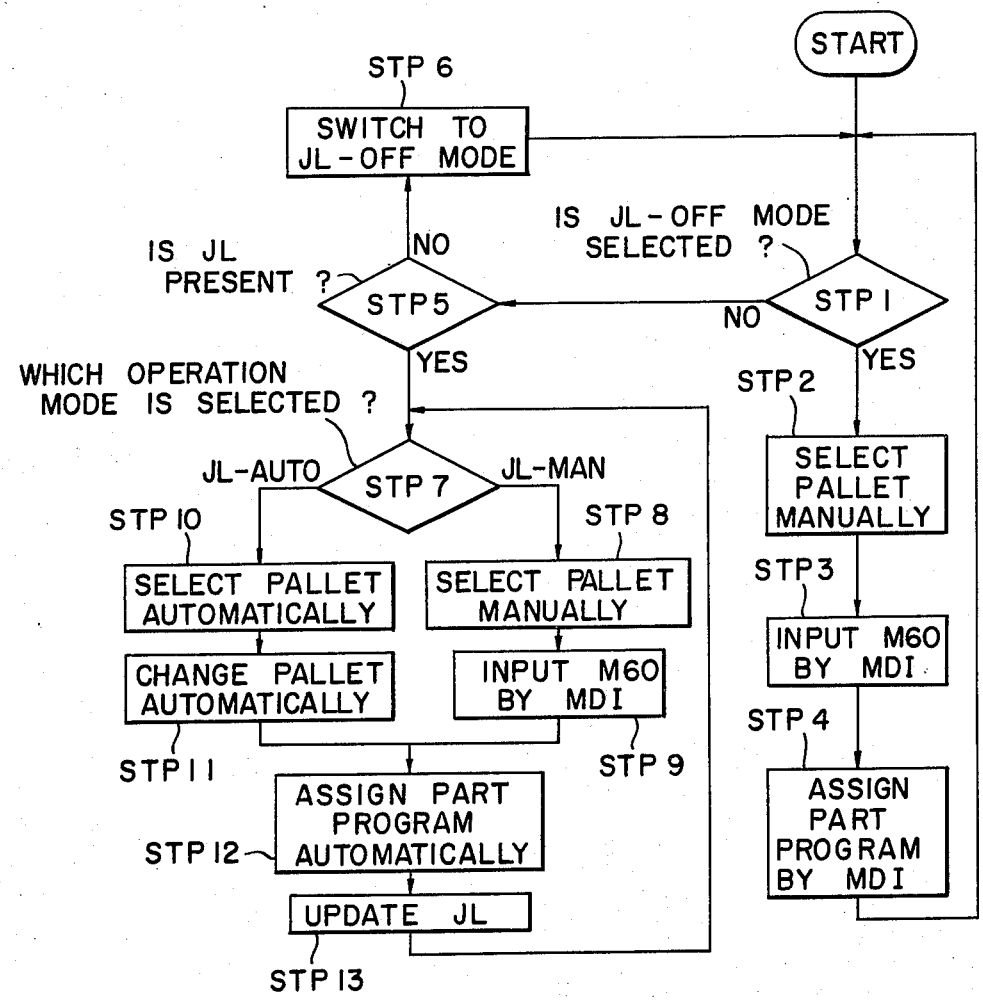
FIG. 11 is a flowchart generally showing the procedure of operation.

FIG. 11 shows execution steps of machining operation in each of the operation modes (JL-AUTO, JL-MAN and JL-OFF). It is assumed that synchronization of the movable stations in the pallet magazine 11 with the system controller 12 and initialization of the logic states of the various switches of the console panel unit 12A are completed before START in FIG. 11.

At judging step (hereinafter referred to as STP) 1, it is checked whether or not the operation mode selection switch (12A-2A in FIG. 8) is in JL-OFF mode.

If it is found to be JL-OFF mode, manual pallet selection is conducted at STP2 to index the pallet PA(j) to the pallet change position PACP1. Thereafter at STP3 an M60 (pallet change) instruction is inputted by the operator by means of MDI, on one of the NC devices (for instance NC1) corresponding to the pallet change position.

At STP4, the part program corresponding to the pallet PA(j) introduced onto the table of the MT1 is designated by means of MDI. With this done, machining on the pallet PA(j) is performed.

If, at STP1, the selection switch is not in JL-OFF mode, the procedure goes to STP5 where it is checked whether or not JL (job list) is present. If JL is present, the procedure is advanced to STP7. If JL is not present, the procedure goes to STP6 where the selection switch 12A-2A is switched to JL-OFF mode.

At STP7, either JL-AUTO or JL-MAN is selected according to the operator's judgement. In JL-MAN, selection of the pallet PA(j) is manually conducted by the operator at STP8. Thereafter, at STP9, and M60 instruction is inputted by means of MDI operation to perform pallet change.

If JL-AUTO is selected at STP7, then automatic pallet selection is made at STP10. Thereafter, automatic pallet change is made at STP11, and the procedure goes to STP12.

At STP12, the part program corresponding to the above-mentioned pallet PA(j) is identified by reference to the memory area M(2) in the system controller 12, and an instruction is given by the system controller 12 to the NC system to execute the identified part program. Thus, machining on the pallet PA(j) is carried out. At STP3, JL is updated, that is the next pallet to be machined on is designated.

It is necessary to input an M60 instruction by means of MDI when MT1 or MT2 is started, as an initial condition of machining operation in JL-AUTO mode.

FIGS. 12A–12G show the details of operation in a slightly modified representation.

Figure 12A:
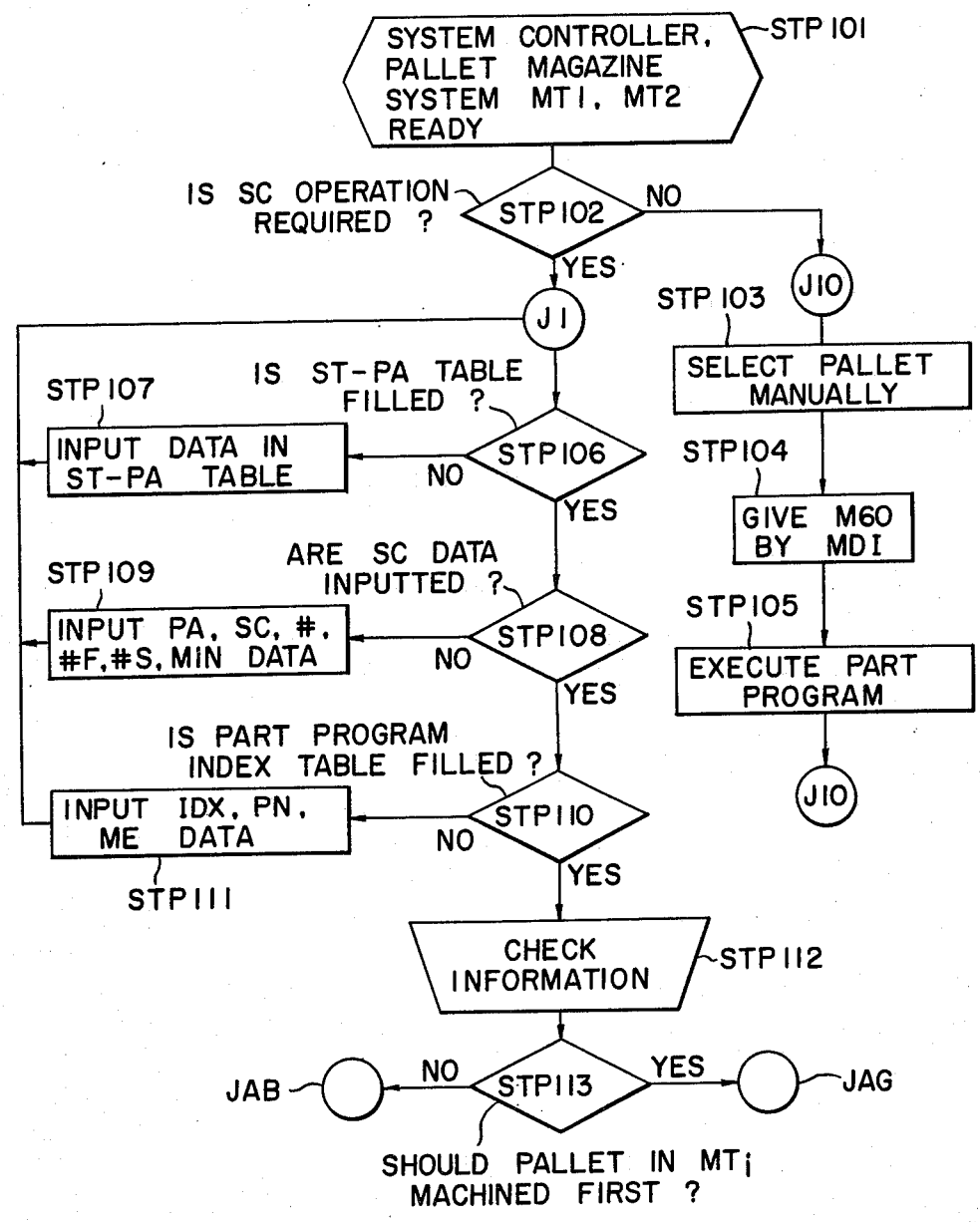
FIGS. 12A–12G are flowcharts showing, in detail, the procedure of operation.
Figure 12B:
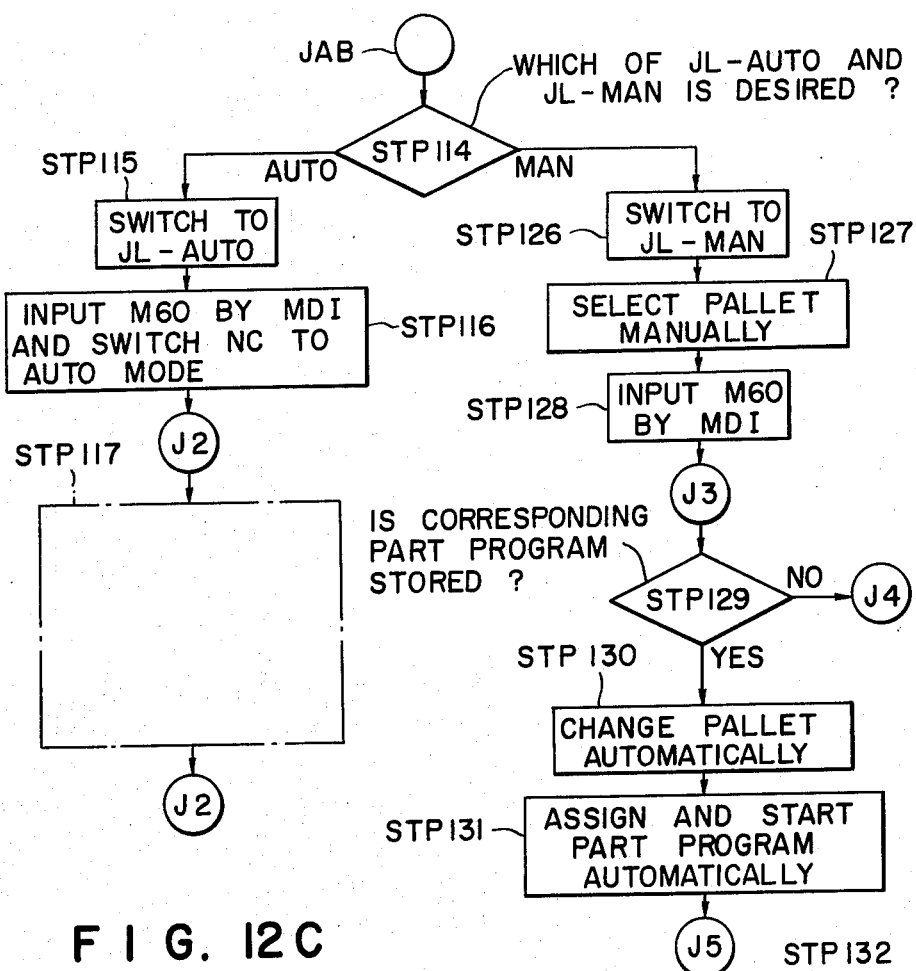
Figure 12C:
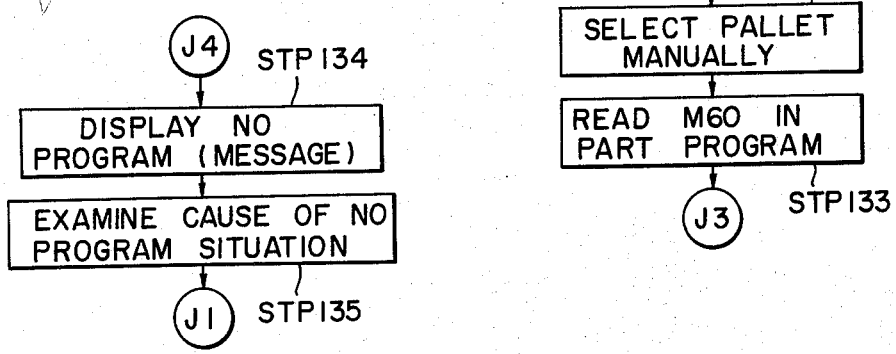

In FIG. 12A, at STP101, the system controller 12, the pallet magazine 11, the machining centers MT1, MT2 are ready for operation (connection to the power supply, synchronization and the like). At STP102, whether or not schedule operation is to be performed is selected by the operator by means of the mode selection switch 12A-2A.

If schedule operation is not selected (i.e., if JL-OFF mode is selected), STP103 through STP105 (roughly corresponding to STP2 through STP4) are executed.

If schedule operation (JL-AUTO mode or JL-MAN mode) is selected at STP102, the procedure goes to STP106, where it is checked whether or not input into the memory M(1), i.e., the table (ST-PA table) of correlation between the movable stations and the pallets is already effected. If it is not yet done, data are inputted by the use of input keys in the panel area 12A-2K to form the ST-PA table.

If the data are already inputted, then it is checked at STP108 whether or not input into the memory area M(3) is already effected. If it is not yet done, the schedule SC, the steps #, the numbers #F, #S of the part programs for the first and the second steps, the waiting time MIN between the first and the second steps for the particular pallet are inputted at STP 109 by the use of the panel area 12A-2K.

If input into the memory area M(3) is already effected, it is checked at STP110 whether or not the memory area M(2) is filled with the required data. If it is not filled, the data concerning IDX, PN (PROGRAM NO.) ME (MACHINE ENABLE) are inputted by the use of the panel area 12A-2K.

If the memory area M(2) is already filled, the procedure goes to STP112.

At STP112, it is checked whether or not information necessary for the schedule operation is stored in the NC devices. Such information includes part programs, and compensation values for the tools used, and part of the information can be set by the use of the data input unit 26A.

It is noted that the STP112 may alternatively be performed before STP106–STP111.

At STP113, selection can be made by the operator as to whether or not the machining is effected first on the pallets in the pallet magazine 11 or with on the pallets on the table of MT1, MT2. If the answer is NO, the procedure goes to STP114, where the operator can make judgement as to which of the modes, JL-AUTO and JL-MAN, should be selected.

When the judgement is for the JL-MAN mode, the selection switch is switched to JL-MAN, at STP126. The JL-MAN mode operation is, in a sense, a schedule operation with an interrupt. The operator can select a pallet corresponding to a schedule number other than the next schedule number in the memory area M(3) at STP127. This may happen if effecting a schedule of a higher number (which therefore is normally performed later) is desired promptly.

At STP127, the particular pallet PA(q) is positioned to the pallet change position.

At STP128 an M60 instruction is inputted by MDI, at a machining center MT1 for example. At STP129, the system controller 12 checks whether or not the part program corresponding to the pallet PA(q) is stored in NC1, by reference to the memory area M(2). Thereafter, direct inquiry is made from the system controller 12 to NCl as to whether the part program is stored in NC1. If it is found to be stored the procedure goes to STP130, where an instruction is given from the system controller 12 to NC1 to drive APC1, so that the pallet PA(q) is introduced onto the table of MT1.

At STP131, assignment of the part program corresponding to the pallet PA(q) is given from the system controller 12 to NC1 to start the assigned part program PART PRG(q). As a result, the workpiece on the pallet PA(q) is machined by MT1.

At STP132, the pallet PA(q+1) which is desired to be subjected to machining next is positioned by the operator to PACP1. Even while STP127 and STP130 are executed, updating of the memory areas M(1), M(3) can be carried out. At STP133, a machining step on the pallet PA(q) is completed and the procedure returns to the junction J3.

If, at STP129, the required part program is not found to be stored in the NC, the procedure goes to the junction J4, and to STP134 where NO PROGRAM message is displayed in the display area 12A-2G in FIG. 8. Thereafter, at STP135, the contents of the memory areas M(1), M(2), M(3) are displayed to permit finding of the reason that the required part program is not stored. After that, the procedure returns to the junction J1.

Returning now to STP114, if JL-AUTO mode is desired, then at STP115, JL-AUTO is selected. At STP116, an MC60 instruction is inputted by MDI and thereafter the NC device is switched to AUTO mode. At this stage, pallet change is not yet effected.

Figure 12D:
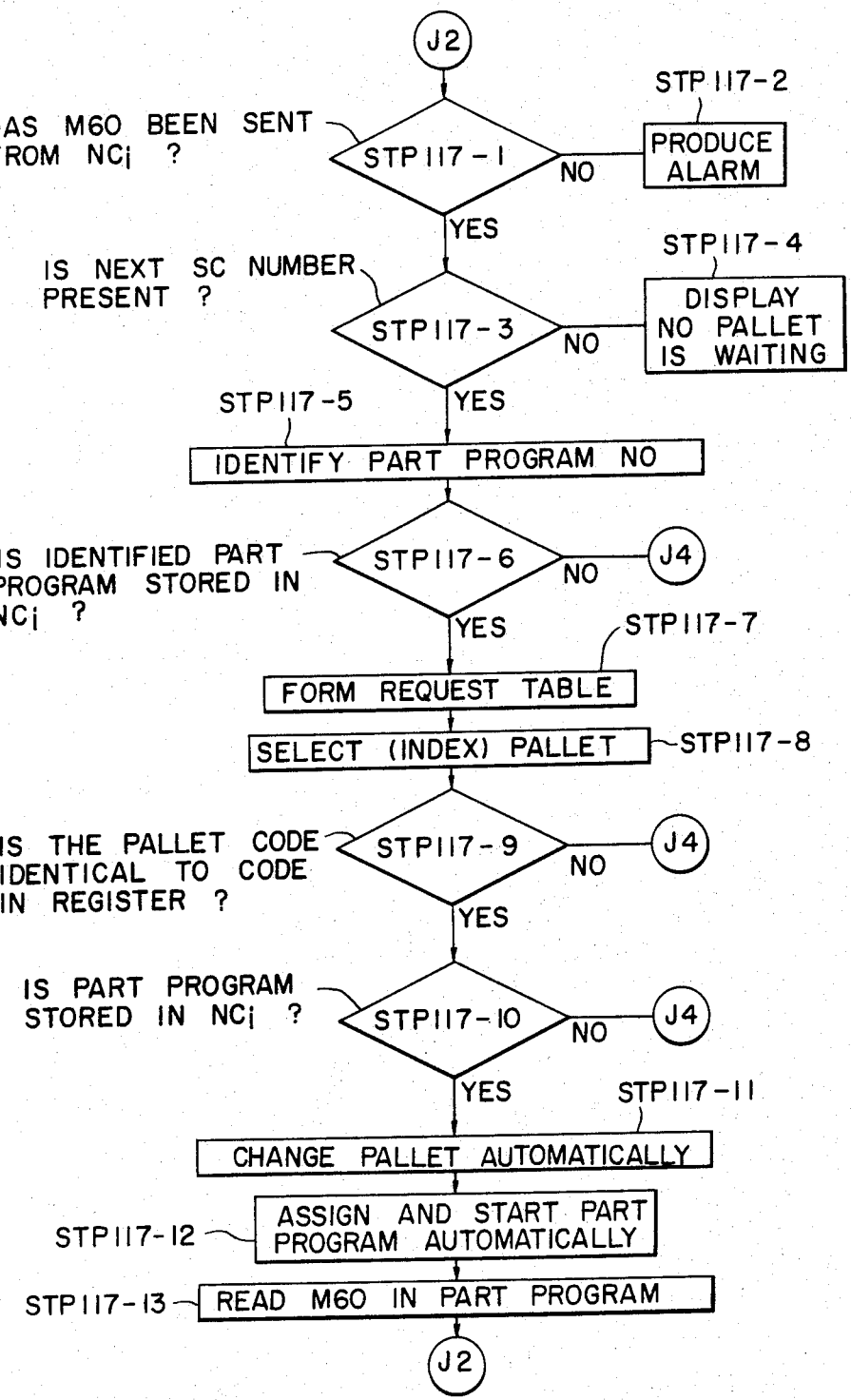

STP117 consists of plural substeps (which are also referred to as STP) shown in FIG. 12D. At STP117-1, it is judged whether either of NC1 and NC2 has given the M60 instruction.

If an M60 instruction is not given, an alarm signal is produced, at STP117-2.

If, at STP117-1, the answer is YES, then at STP117-3, it is judged whether or not the next schedule number NEXT SCNO is stored in the memory area M(3). If NEXT SCNO is not stored, the procedure goes to STP117-4, where a display is effected to indicate that no pallet is waiting for machining in the pallet magazine 11. This may happen for instance when machining on all the pallets have been completed. If at STP117-3, NEXT SCNO is found to be present, the procedure goes to STP117-5, where the number PART PRGNO of the part program to be used for the next machining (that one of the two part program numbers specified by the code 1 or 2 under #) is identified. Then, at STP117-6, whether or not the identified PART PRGNO is stored in NCi which has given the M60 instruction by examining the memory area M(2). If the answer is NO, the procedure returns to the junction J4. If the answer is YES, then the table in the memory area M(4) is formed and updated at STP117-7, and above-mentioned pallet is indexed to PACPi for the MTi in accordance with the formed table (i.e., the pallet is selected).

At STP117-9, the pallet identifying code number member formed on the indexed pallet is detected, and the identifying code is read and is compared with the pallet code stored in the register in the data memory in the system controller. If they are not identical, the procedure goes to the junction J4.

If they are identical, the system controller 12 checks whether or not the PART PRGNO identified at STP 117-5 is stored in NCi for MTi which has produced the M60 instruction, this time without relying on the contents of the memory area M(2), i.e., directly. This direct check may be accomplished by having the numbers of the part programs which are stored in NCi stored in advance in the data memory in the system controller 12 and making the comparison in the system controller 12. It may alternatively be accomplished, by transferring, each time the necessity for comparison arises, the numbers of the part programs from NCi to the system controller 12 and making the comparison.

If the answer at STP117-10 is NO, the procedure goes to the junction J4. If the answer is YES, then, at STP117-11, the system controller 12 gives an instruction for causing APCi to change pallet for NCi. At STP117-12, the system controller 12 assigns and starts the part program for NCi. With this done, the machining on the pallet is commenced. At STP117-13, NCi reads the last program block (M60) of the part program. When this M60 instruction is given the procedure returns to the junction J2.

STP117-9 and STP117-10 are the steps for confirming that STP117-8 has been properly done, and may be omitted to simplify the procedure and to eliminate the necessity for the identifying member mounted to the pallet and the detecting member.

In the example shown in FIG. 12D, and M60 instruction is given to the system controller 12, and pallet selection (STP117-8) is conducted responsive to the M60 instruction. For instance, the operation of selecting (indexing to the pallet change position) the pallet of the next schedule number for a certain MTi is conducted after the part program for the pallet being machined by the MTi proceeds to the M60 program block (i.e., completion of the machining), the M60 instruction is given to the system controller 12, and, at STP117-1 - STP117-7, the next schedule number is designated and the request table is formed and updated. This means that even if machining on a pallet is completed, pallet change cannot be carried out until the next pallet is brought to PACPi. During such interval, the MTi is not working. For this reason, machining center is not fully utilized.

To eliminate this problem, the arrangement may alternatively be such that an M70 (NEAR PROGRAM END) instruction is inserted before the M60 instruction, the pallet selection is commenced when the M70 instruction is executed or given by NCi to the system controller 12, and the pallet change is promptly commenced when M60 instruction is given.

Figure 12E:
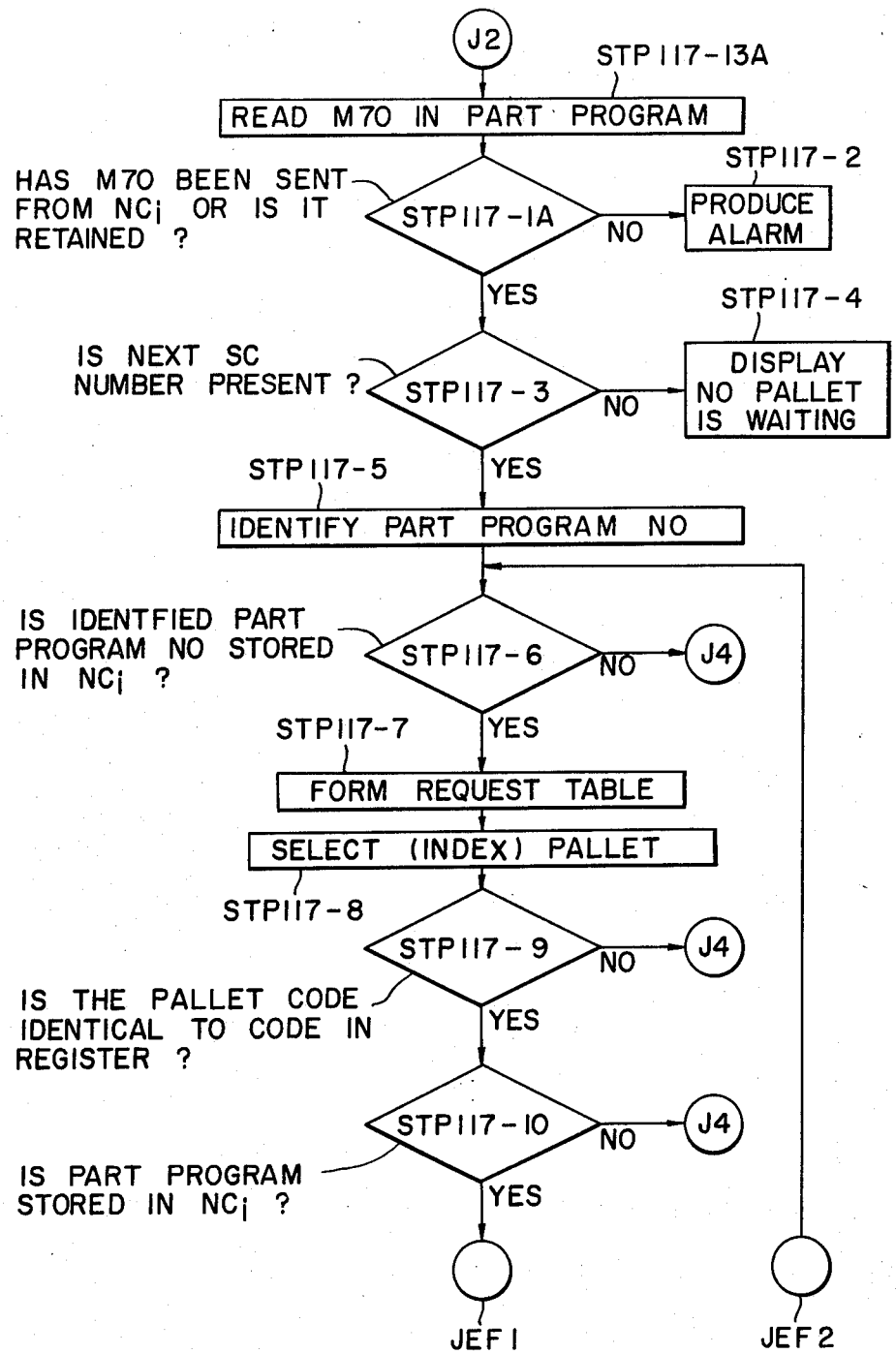
Figure 12F:
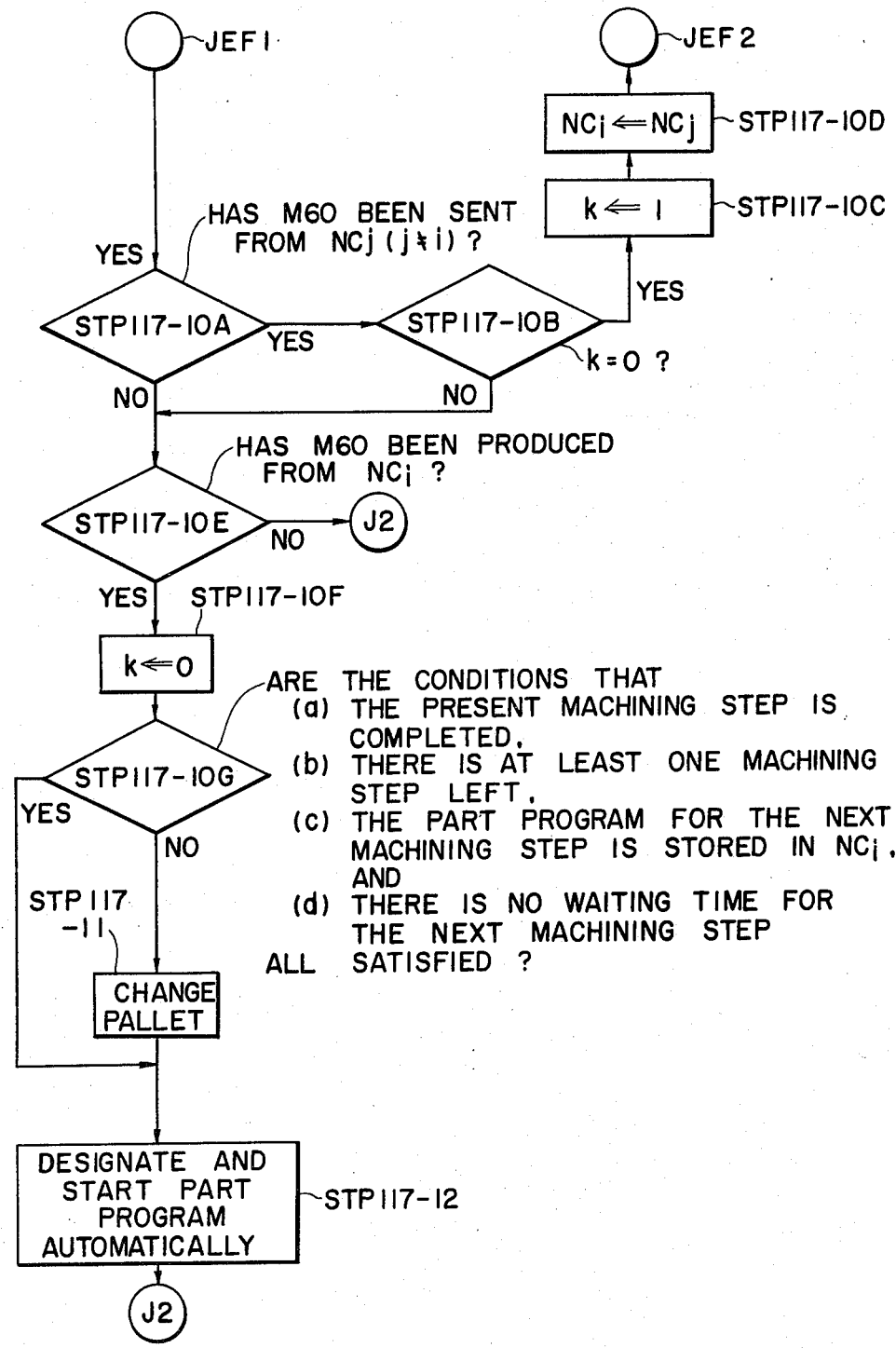

FIGS. 12E and 12F show the procedure of such operation. In FIGS. 12E and 12F, the steps identifies by the same reference numerals as those in FIG. 12D are substantially identical to those in FIG. 12D. Explanations on only the different or additional steps are given below.

At STP117-13A, which in a way corresponds to STP 117-13 in FIG. 12D, an M70 instruction is read. If both NC1 and NC2 have given the M70 instruction, the one that has given the M70 instruction first will be taken care of. At STP117-1A, it is checked whether or not an M70 has been given from NCi or is retained. At STP117-8, the next pallet is brought to PACPi for MTi.

It the answer at STP117-10 is YES, it is then checked at STP117-10A whether or not an M60 instruction has been given from NCj (j =2, for instance) different from the NCi (i =1) which has produced the M70 instruction which has been detected at STP117-1A. If the answer at STP117-10A is NO, the procedure goes to STP 117–10E. If the answer is YES, the procedure goes to STP117-10B, where it is checked whether or not k =0, k being a parameter which can assume a value "0" or "1", and which is arranged to assume the value "0" upon initialization. If the answer at STP 117-10B is YES, then, at STP117-10C, k is set to "1". Thereafter, at STP117-10D, "NCi" is replaced by "NCj", in other words, i is made to be 2 made j is made to be 1, and the procedure goes back to STP117-6, where it is examined whether or not the part program for machining the next pallet is stored in NCi (i=2) by examining the memory area M(2). In this way, the procedure is proceeded to STP117-10A. Since the step of setting k to "1" is taken, and normally an M60 instruction has not been given from NCj (j=1) the procedure goes to STP117-10E.

However, it is possible that an M60 instruction is given from NCj (j=1) in a state where k=1. For instance, assume an M70 instruction is given from NCi (i=1) at STP117-13A. If an M60 instruction is given from NCj (j=2), the answer at STP117-10A is YES and since initially k=0, k is set to "1" at STP117-10C and, in effect, NCi is made to signify NC2 and NCj is made to signify NC2. And, again STP's 117-6,-7, -8, -9, and -10 are taken, and at STP117-10A, the NCj (j=1) has given M60 instruction, the answer at STP117-10A is YES.

In this case, however, k is already set to "1" when STP117-10B is reached, the answer at STP117-10B is NO, so the procedure goes to STP117-10E. Thus, at this stage, the M60 instruction from NCi (i=2) is given priority over the M60 instruction from NCj (j=1).

If it is found at STP117-10E that an M60 instruction is given from NCi, k is set to "0" at STP117-10F, and the procedure goes to STP117-10G, where it is checked whether or not the following conditions: (a) that the present machining step is completed; (b) that there is at least one machining step yet to be done; (c)

that the part program for the next machining step is present in NCi; and (d) that there is no waiting time for the next machining step, are all satisfied.

STP117-9 and STP117-10 may be conducted after STP 117-10G.

If the answer at STP117-10G is NO, pallet is changed at STP117-11, i.e., the next pallet which was selected at STP117-8 is introduced onto the table of MTi. At STP117-12, an instruction is given from the system controller 12 for assigning and starting the part program and machining on the pallet which has been newly introduced is commenced.

If the answer at STP117-10G is YES, the pallet change is not effected, and the next machining step is effected on the same MTi. This means that the automatic program assignment and starting are made not for the pallet corresponding to the next SC number, but for the pallet which is then on the table of the MTi.

By insertion of STP117-10G, the pallet which should be subjected to plural machining steps can be machined successively on the same machining center, provided that no waiting time is required between the machining steps and the part program for the next machining step is stored in the associated NC device.

Figure 12G:
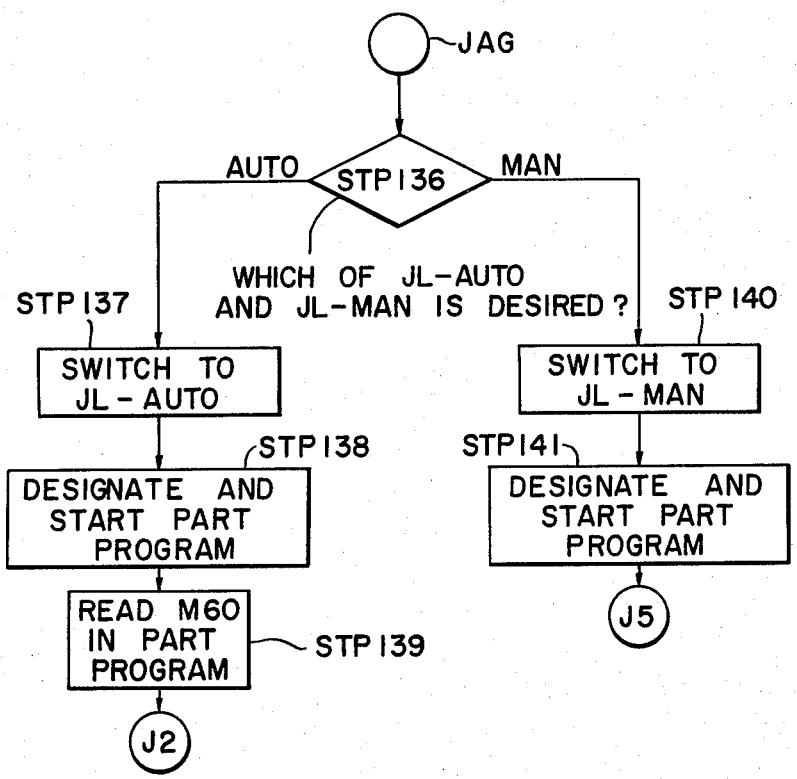

If the answer at STP113 in FIG. 12A is YES, then the procedure is advanced to STP136 shown in FIG. 12G. If, at STP136, JL-AUTO mode is desired, then at STP137, the operator switches the selection switch 12A-2A to JL-AUTO mode. Thereaftr, at STP138, the required part program is assigned and started. Thus, the machining on the pallet which is on the table of MT1, MT2 is commenced. It is noted that the part programs are started at STP138, in the order of their SC numbers, from the lowest to the highest numbers, in each of MT1 and MT2.

At STP139, the machining on the pallet is completed and the M60 instruction is produced. Thereafter, the procedure goes back to the junction J2.

If the JL-MAN mode is desired, at STP136, the operator switches the selection switch 12A-2A to JL-MAN at STP 140. Then at STP141, the system controller 12 assigns the required part program for each of the NC systems, is the same way as at STP138. After machining on the pallet in each of the NC systems, the procedure goes to the junction J5.

FIGS. 13A and 13B show change of the contents in the space under # in the third memory area shown in FIG. 5. FIG. 13A shows such change situation where one of the pallets on the pallet magazine is first machined. In the embodiment shown, the maximum number of the machining steps stored in relation to each schedule number is 2, and the machining steps are identified by #=1 and #=2. When the space under # is not filled with 1 or 2, i.e. it is blank, as indicated by BL in FIGS. 9A and 9B, the machining steps by the schedule operation identified by the part program number in the same row is not performed on the pallet identified by the pallet number in the same row. In FIG. 13A, it is assumed that the pallet on the pallet magazine is excluded from the schedule operation so that the space # is shown as blank (BL). The process of setting the first machining step in the space # of the pallet is as follows:

The first row (A) shows change of the contents of the space # in a situation in which the pallet is excluded from the schedule operation. In the stage (1) when the content in the space # is set for the pallet on the pallet magazine, the space in the memory table M(3) is made blank (shown by BL). In the stage (2), when the pallet is introduced onto the table of the MT by means of MDI, the above-mentioned space is still kept blank. In the stage (3), when an M60 instruction is given by means of MDI to give increment by "1", "1" is written in the above-mentioned space. In the stage (4) when an M60 is given and a pallet is again introduced into the MT, the content in the space in unchanged. In the stage (5), the pallet is returned to the pallet magazine to give another increment by "1" so that the content of the space becomes "2". In the stage (6), a pallet is introduced into the MT, when the content of the space is unchanged. In the stage (7), an M60 is again given and the pallet is withdrawn to the pallet magazine, and thus the machining is completed, and the content of the above-mentioned space may be changed to "BL", "1" by "2" depending on the desired operation on the workpiece to be carried on the same pallet. When the machining step is completed, all the plasma display elements in the display area corresponding to the space under SC in the row are turned on.

As will be apparent, when a pallet is transferred from the pallet magazine to the machining center, the content in the space # is not changed. When a pallet is transferred from the machining center to the pallet magazine, the content in the space # is changed. (For example, "BL" is changed to "1", "1" is changed to "2", and "2" is changed to "BL".)

The second row (B) shows change of the content in the space # in a situation where only the first step #1 is set concerning a pallet. In the stage (1), a pallet is on the pallet magazine and the content is "1". In the stage (2), the pallet is transferred to the machining center, and the content is unchanged. In the stage (3), an M60 instruction is given and the pallet is returned to the pallet magazine. Thus, the machining is completed. The content is set, for example, to "1" when the next workpiece is set on the same pallet.

The third row (C) shows change of the content in the space # in a situation where only the second step #2 is set in the stage (1). In the stage (2), an M60 instruction is given and a pallet is transferred to the machining center. The content "2" is unchanged. In the stage (3), an M60 instruction is given and the pallet is returned to the pallet magazine. Thus, the machining is completed. The content is changed to BL. (But, if the next workpiece is to be first subjected to the first machining #1, the content is changed to "1").

The fourth row (D) shows change of the content in the space # in a situation where the content is set to "1" at the beginning. In the stage (2), the pallet is transferred to the machining center. The content "1" is unchanged. In the stage (3), an M60 instruction is given and the pallet is returned to the pallet magazine, and the content "1" is incremented to "2". In the stage (4), an M60 instruction is given and the pallet is transferred to the machining center. The content is unchanged. In the stage (5), an M60 instruction is given and the pallet is transferred to the pallet magazine. Thus, the machining is completed. If the next machining is commenced with the "first" machining step, the content is changed to "1".

FIG. 13B shows change of the contents in the space # in situations where a pallet in the machining center is machined first.

In the first row (A), a pallet which is at the beginning in the machining center is not machined but is transferred to the pallet magazine and thereafter the machining is commenced with a "first" machining step.

In the second row (B), a pallet which is at the beginning in the machining center is subjected to a "first" machining step.

In the third row (C), a pallet which is at the beginning in the machining center is subjected to a "second" machining step.

In the fourth row (D), a pallet which is at the beginning in the machining center is subjected to a "first" machining step and then a "second" machining step.

Figure 14:
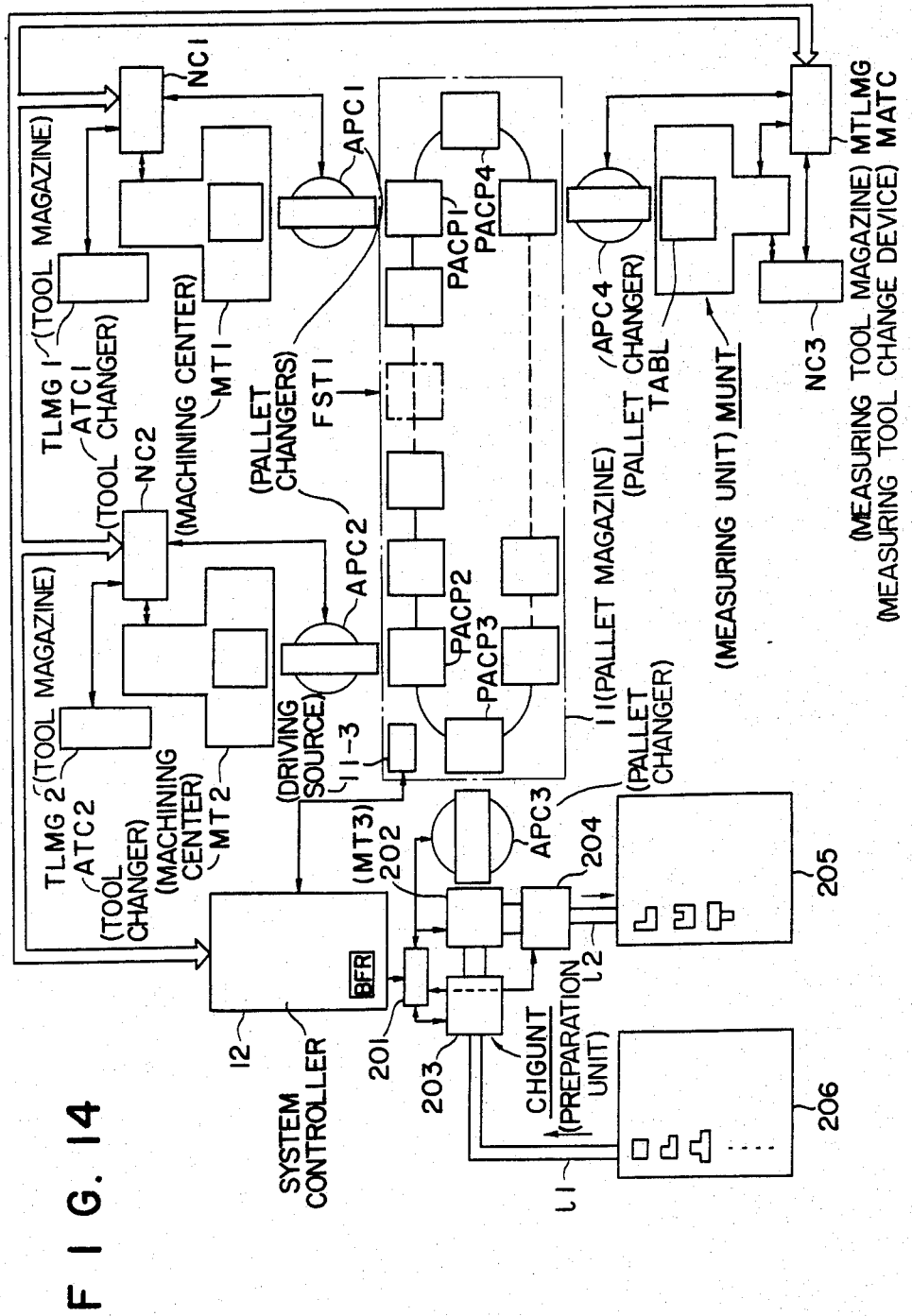
FIG. 14 is a block diagram showing the general construction of another example of a machining system.

FIG. 14 shows a modification of the system shown in FIG. 1 in which a preparation unit CHGUNT and a measuring unit MUNT are added. (It will be noted that instead of providing both the CHGUNT and the MUNT, only one of them may be provided).

The preparation unit CHGUNT includes a preparation station 202. Provided between the preparation station 202 and the pallet magazine 11 is an automatic pallet changer APC3 similar to APC1 and APC2. The preparation station 202 is coupled to a workpiece supply device 203 which in turn is coupled via a line 11 to a workpiece stocker 206 for stocking unmachined workpieces. The preparation station 202 is also coupled to a workpiece discharge device 204, which in turn is coupled via a line 12 to a workpiece stocker 205 for stocking workpieces on which machining is completed or cutting abnormality or the like has occurred.

The preparation unit CHGUNT further includes a control unit 201, which is coupled to the system controller 12. The control unit 201 is also coupled to drive mechanisms provided between the devices 204 and 205, and between the devices 203 and 206, for transferring workpieces. The control unit 201 is also coupled to a drive mechanism of APC3.

The control unit 201 is provided with a pushbutton switch (preparation completion signal producing switch) for giving an instruction to set (mount) an unmachined workpiece on a pallet on the preparation station 202 and to exchange the pallet carrying the unmachined pallet with another pallet in the pallet change positions PACP3. When this pushbutton is depressed after completion of the preparation, the system controller 12 gives the pallet magazine 11 an instruction to treat the signal SG in the same way as an M60 instruction and to select and position to PACP3 the pallet which should be exchanged. It should be noted that the pallet which is selected is not the one having the lowest schedule number, but the pallet, machining on which has been completed. The SC number in the SC number area corresponding to such a pallet is deleted, and the plasma display elements are all on in the SC space. Where there are plural pallets machining on which has been completed, the pallet selection can be made in one of various ways. For instance, if the processing is to be made in accordance with the memory area M(3) only, the designation may be made in the order of the positions in M(3), e.g., from the top to the bottom. Alternatively, if the memory area M(1) can be also used, the pallet (among those machining on which has been completed) closest to PACP3 may be selected.

The control unit 201 is provided with input keys used for specifying the number of the pallet (the SC number corresponding to which is deleted) which is desired by the operator to be positioned to PACP3 by MDI.

In setting an unmachined workpiece on the pallet on the preparation station 202, it is usually necessary to modify or change the schedule number SCN0, the tool number #NO, the part program numbers #F PROG, #S PROG, the waiting time MIN and the like in the memory table M(3) for the particular pallet. However, when the same workpiece as before is set on the same pallet, such modification is not always necessary.

When it is desired to modify the content of the memory area M(3), input keys in the panel area 12A-2K in FIG. 8 are used to input new data into the data memory device 12-6A (in FIG. 2), and to transfer the contents BFR of the memory device of the appropriate area of M(3) when during the progress of the control program of the system controller, interrupt is permitted. In this way, the memory area M(3) can be modified even in JL-AUTO mode. The above-mentioned input keys may additionally be provided in the control unit 201. The preparation station 202 can be treated in the same way as a machining center, and hence as another machining center MT3 because of its similarity in the connection to APC3 and the system controller 12. The difference resides in that setting and unsetting of a pallet, rather than machining, are conducted in the preparation station 202 (MT3). The control unit 201 has a display device for displaying that the pallet to be exchanged has been positioned to PACP3.

Provision of the preparation unit CHGUNT enables continuous machining operation of the system.

The measuring unit MUNT measures the dimensions, such as diameter, of the machined workpiece which has been introduced through a pallet change device APC4 onto a measuring table TABL. An NC device NC3 stores various measuring programs for moving a measuring head relative to the machined workpiece. The measuring programs in NC3 may be likened to the machining programs in NC1 and NC3.

A measuring tool magazine MTLMG stores measuring tools each having a measuring head at its end, and corresponds to the tool magazine TLMG provided for each machining center. An automatic measuring tool change device MATC mounts the measuring tools to the measuring device. By having an M60 instruction or an M70 instruction at or near the end of each measuring program, pallet change can be achieved after completion of the measurement. Selection of the pallet to be positioned to PACP4 can be made either by designating the schedule number, in advance, in the schedule table of the memory area M(3), or by storing both a part program and a measuring program corresponding to one schedule in M(3). Not all the pallets require measurement, so that designation is made to only those pallets which require measurement.

The memory table M(3) shown in FIG. 5 may be modified in the following manner. To simplify the description, explanation will be made only with reference to JL-AUTO mode.

In FIG. 5, one pallet number corresponds to one schedule number, and the part program numbers are stored in a number equal to the number of the machining steps (2, in the example described). In the modified form, only one part program number is made to correspond to one schedule number, and a second part program number is made to correspond to another schedule number. With this arrangement, machining steps and measuring steps can be designated by different schedule numbers where machining steps and measuring steps can be alternately carried out.

In FIG. 5, instead of incrementing the machining step number (#NO), the arrangement is such that all the plasma display elements in a display area in front of (i.e., at the left of) the display area displaying the part program number are all turned on when the machining according to the corresponding machining step is completed. This will enable indication of completion of the machining step.

Instead of having the SC number display area in M(3) entirely illuminated when the machining on the corresponding pallet is completed, it may be so arranged that a separate completion display area is provided for indication of the completion.

Machining and measurement steps on a pallet may be divided into plural groups and each group may be made to correspond to one SC number.

The pallets with a waiting time MIN specified are made to wait on the pallet magazine 11. This waiting time is set mostly because of temperature rise during rough machining. If forced cooling is adopted, the waiting time can be reduced. Accordingly, a cooling device (such as a one blowing out cool air) may be additionally provided adjacent to the pallet magazine 11 and is coupled to the pallet magazine 11 through a pallet change device.

A cleaning unit for removing machining chips from each pallet after completion of a machining step or of all the machining steps, may be additionally provided and coupled to the pallet magazine system through a pallet change device.

In the embodiments described, there are two machining centers. But the invention is also applicable where there are more machining centers, or NC machine tools of other types.

In the embodiments described, the pallet magazine system has a loop-shaped path for the pallets. But the invention is applicable where the path for the pallets is other than a loop-shaped one, e.g., linear.

In the embodiments described, input to the memory areas M(1), M(2) and M(3) is achieved by means of the input keys in the panel areas 12A-2K. But the arrangement may alternatively be such that input to the memory areas is effected in some other place and transferred to the data memory of the system controller prior to the operation of the system.

Features and advantages of the present invention are summarized below:

(a) Memory areas M(1), M(2) and M(3) respectively store the correlation between the pallet numbers and the movable station numbers, the correlation between part program numbers and the numbers of the machining centers storing the part programs and the correlation between numbers of schedules for the pallets and the numbers of part programs for the machining steps to be performed at the schedules are provided in the system controller, part programs in NC devices for the machining centers are no longer required to contain data concerning pallet selection in connection with conveyance of pallets in the pallet magazine and transfer of pallets between each machining center and the pallet magazine.

(b) An M70 (NEAR PROGRAM END) instruction is set in a program block near the end of each part program, so that the pallet is brought to a pallet change position before completion of machining. (Pallet selection is effected responsive to an M70 instruction.)

(c) The system controller has the third memory area M(3) in which the schedule numbers can be specified by the operator, so that the order of machining can be chosen at the convenience of the manufacture department.

(d) The system controller can operate in any one of the JL-AUTO, JL-MAN and JL-OFF modes, so that the system has flexibility. For instance, upon occurrence of a necessity for machining on a pallet whose schedule number is relatively high (and hence is to be machined later in the JL-AUTO mode) while in the JL-AUTO mode operation, the operation mode can be switched to the JL-MAN, and that pallet can be selected by MDI.

(e) The system controller has a display panel by which the numbers of the pallets in the pallet magazine and the locations of the movable stations are displayed, and the pallets machining on which has been completed are displayed, so that the operator can observe the progress of the machining.

(f) The display of the completion of the machining is made by means of pushbuttons provided for the respective pallets and provided with an illuminating lamp. By depressing the pushbutton, the corresponding pallet is treated as if its machining had been completed, and hence it will be excluded from the schedule machining.

(g) The system controller is provided with an input device for writing, modification, addition, change and the like of the contents of the memory areas, so that the schedules can be formed in the manufacture department.

(h) With the provision of the preparation unit, the pallets whose machining has been completed or the pallets whose machining has been disabled can be discharged and pallets with unmachined workpieces can be introduced in place, so that operation of the system is not interrupted.

(i) With the provision of the measuring unit, the dimensions whose measurement after machining is desired can be automatically measured. This feature is important particularly because it is possible to obtain data in the intermediate stages, such as after rough machining.

(j) A waiting time can be set between a machining step and the next machining step and the pallet during its waiting time is not machined. This feature is advantages where, for instance, it is necessary to cool the workpiece after the first step (rough machining, for instance) before the next step (finish machining, for example) by natural heat dissipation, without resorting to special device.

(k) The NC device is provided with an input device 26 (FIG. 10). With the input device 26, it is possible to specify that tool breakage detection program be executed, and that adaptive control program be executed, and to specify various items concerning the tools designated by the part program. It is therefore unnecessary to specify the various items in the part program. Preparation of the part program will not involve consideration on the various items concerning the individual tools, and hence is made much simpler and easier. This can be said that the role of the programmer in the programming department and the role of the operator in the manufacture department are properly divided.

(l) Where plural machining steps are to be made on a pallet without a waiting time between the steps, the pallet is machined in the same machine tool without once withdrawing the pallet from the machine tool to the pallet magazine between the steps.

What is claimed is:

1. A machining system including a plurality of machine tools each capable of performing, in a working area thereof, machining on a workpiece carried on a pallet, a pallet magazine system including a plurality of movable stations each capable of carrying and conveying a pallet and having a plurality of pallet change positions each associated with each of the machine tools, a plurality of pallet change devices each associated with each of the machine tools and each capable of transferring a pallet between the working area of the associated machine tool and the associated pallet change position, a plurality of numerical control devices each associated with each of the machine tools and each capable of storing part programs and of controlling the associated machine tool, and a system controller, said system controller comprising:

first memory means for storing, in relation to a schedule number indicating order of machining, an indicium of a pallet carrying a workpiece to be machined in the order indicated by the related schedule number and an indicium of a part program to be used for machining the related pallet, and second memory means for storing, in relation to an indicium of each of the pallets, an indicium of the movable station carrying the related pallet.

2. A machining system according to claim 1, wherein said system controller further comprises a central processing unit which is capable of assigning, in accordance with the contents of the first memory means, a part program to be used for machining a workpiece on a pallet which has been transferred into the working area of a machine tool and instructing the associated numerical control device to start machining in accordance with the assigned part program.

3. A machining system according to claim 2, wherein each of the part programs contains an end instruction indicating completion of the machining, and said central processing unit is capable of referring, responsive to an end instruction from any of the numerical control devices, to the first memory means to determine the pallet carrying the workpiece to be machined next and the part program to be used for the next machining.

4. A machining system according to claim 3, wherein said cental processing unit is capable of referring, responsive to the indicium of the pallet carrying the workpiece to be machined next, to the second memory means to determine the movable station carrying the abovementioned pallet and of instructing the pallet magazine system to move the above-mentioned movable station and hence the above-mentioned pallet to the pallet change position associated with the numerical control device that has produced the end instruction.

5. A machining system according to claim 4, wherein each of the numerical control devices is capable of causing pallet change operation of the associated pallet change device and said central processing unit is capable of instructing, upon positioning of the pallet carrying the workpiece to be machined next to the pallet change position associated with the numerical control device that has produced the end instruction, the above-mentioned numerical control device to cause the pallet change operation.

6. A machining system according to claim 2, wherein said system controller further comprises third memory means for storing in relation to the indicium of each of part programs, one or more indicia of the numerical control devices storing the related part program.

7. A machining system according to claim 6, wherein said central processing unit is capable of referring, responsive to the indicium of the part program to be used for the next machining, to said third memory means to determine whether or not the above-mentioned part program is stored in the numerical control system to be used in the next machining, and of referring, if the abovementioned part program is found not to be stored, again to the first memory means to determine, the pallet and the part program related to the schedule number of the succeeding order, the reference by said central processing unit to the first and the third memory means being repeated until the part program read out of the first memory means is found, by reference to the third memory means, to be stored in the above-mentioned numerical control device, and the instruction by the central processing unit to start machining being given only upon confirmation that the part program to be used in the next machining is stored in the numerical control device to be used in the next machining.

8. A machining system according to claim 1, wherein said system controller further comprises display means capable of displaying at least part of the contents of the first and the second memory means in the form of a table.

9. A machining system according to claim 1, wherein said system controller further comprises third memory means for storing, in relation to an indicium of each of the part programs, one or more indicia of the numerical control devices storing the related part program.

10. A machining system according to claim 9, wherein said central processing unit is capable of referring to the third memory means to ascertain that the part program to be used for the next machining is stored in the numerical control device to be used in the next machining.

11. A machining system according to claim 9, wherein said system controller further comprises display means capable of displaying, at least part of the contents of the first, the second and the third memory means in the form of a table.

12. A machining system according to claim 9, wherein indicia of the working areas of the machine tools are treated in the same way as the indicia of the movable stations.

13. A machining system according to claim 12, wherein said system controller further comprises memory means for storing the data indicating completion of machining on the respective pallets.

14. A machining system according to claim 13, wherein the data indicating the completion of the machining are stored in the memory area for storing the schedule numbers, in place of the schedule numbers.

15. A machining system according to claim 12, wherein said first memory means stores, in relation to one schedule number, a plurality of part program indicia and includes a memory area for storing the indicium of the part program to be executed next, said indicium of the part program to be performed next being incremented until all the part programs whose indicia are stored against said schedule number are completed.

16. A machining system according to claim 15, wherein said system controller further comprises a memory area for storing, in relation to each workpiece indicium, data indicating the waiting time between successive machining steps.

17. A machining system according to claim 16, wherein said memory area for storing data indicating the waiting time is provided in said first memory means.

18. A machining system according to claim 15, wherein said system controller is adapted to increment said indicium of the part program to be executed next responsive to a pallet change instruction provided at the end of each part program.

19. A control system according to claim 12, wherein said first and second memory means are adapted to update their contents responsive to an end instruction produced by any one of the machine tools.

20. A control system according to claim 19, wherein a pallet change instruction is used as the end instruction.

21. A machining system according to claim 12, wherein a pallet change instruction is used as the end instruction.

22. A machining system according to claim 12, wherein each part program contains a near end instruction in advance of a pallet change instruction, the near end instruction is used as the end instruction, and said system controller is responsive to said near end instruction for giving the pallet magazine system a drive instruction to cause positioning of the pallet corresponding to the next schedule number to said pallet change position, before completion of the machining performed in accordance with the part program whose near end instruction has been used to cause said positioning.

23. A machining system according to claim 22, wherein said system controller is adapted to give priority to the end instruction over the near end instruction concerning the positioning of the pallet, where one of the numerical control devices has given the near end instruction first and another numerical control device has given the end instruction earlier than said one of the numerical control systems.

24. A machining system according to claim 12, wherein said first memory means is adapted to store an indicium of each pallet in relation to a plurality of schedule numbers.

25. A machining system according to claim 24, wherein said first memory means is adapted to store an indicium of each part program in relation to a schedule number.

26. A machining system according to claim 25, wherein said system controller is adapted to instruct execution of a part program for the next machining step without instructing pallet change if, when one of the numerical control device has given the system controller the end instruction indicating the end of a machining step, there is another machining step succeeding the first-mentioned machining step, and a part program for the succeeding machining step is stored in the numerical control device that has given the machining end instruction.

27. A machining system according to claim 12, wherein said system controller is provided with an input device for inputting data into said first, second and third memory means.

28. A machining system according to claim 12, wherein said system controller is provided with a console unit which includes first display means associated with said first and second memory means and displaying the indicia of the movable stations and the indicia of pallets carried on the respective movable stations, and second display means indicating whether or not machining is completed on the workpieces carried on the respective pallets, whereby said first and second display means permit the operator to know which pallets are on which movable stations and whether or not machining on each pallet is completed.

29. A machining system according to claim 28, wherein said second display means comprises pushbutton switches with illuminating means, capable of being operated by the operator to assume either one of turn-on condition and turn-off condition, and said system controller is adapted to exclude the pallets when the corresponding ones of said pushbutton switches are in the predetermined one of the conditions.

30. A machining system including a plurality of machine tools each capable of performing, in a working area, machining on a workpiece carried on a pallet, a measuring unit for measuring, in a working area, a dimension of a workpiece, a pallet magazine system including a plurality of movable stations each capable of carrying and conveying a pallet and having a plurality of pallet change positions each associated with each of the machine tools and the measuring unit, a plurality of pallet change devices each associated with each of the machine tools and the measuring unit and each capable of transferring a pallet between the working area of the associated machine tool or measuring unit and the associated pallet change position of the pallet magazine system, a plurality of numerical control devices each associated with each of the machine tools and each capable of storing part programs each containing an end instruction at or near the end of the program and of controlling the associated machine tool in accordance with the part programs, a measuring unit control device capable of storing measuring programs each containing an end instruction at or near the end of the program and of controlling the measuring unit in accordance with the measuring programs, and a system controller responsive to the end instruction from any of said numerical control devices and said measuring unit device system for designating the pallet carrying a workpiece to be machined or measured next, and controlling the pallet magazine system to position the designated pallet to the pallet change position associated with the numerical control device or the measuring unit control device that has produced the end instruction, said system controller comprising:

first memory means for storing, in relation to each of the schedule numbers indicating the order of machining or measuring, an indicium of a pallet to be machined or measured in the indicated order and an indicium of a part program or a measuring program to be used for machining or measuring the related pallet, and second memory means for storing, in relation to an indicium of each of the pallets, an indicium of the movable station carrying the related pallet.

31. A machining system according to claim 30, wherein said system controller further comprises third memory means for storing, in relation to an indicium of each of part programs and measuring programs, one or more indicia of the numerical control devices or the measuring unit control device storing the related program or measuring program, and a central processing unit which is capable of referring to the third memory means to ascertain that the part program or the measuring program to be used in the next machining or measuring is stored in the numerical control device or the measuring unit control device to be used for the next machining or measuring.

32. A machining system according to claim 31, wherein indicia of the working areas of the machine tools and the measuring unit are treated in the same way as the indicia of the movable stations.

33. A machining system including a plurality of machine tools each capable of performing, in a working area, machining of workpiece carried on a pallet, a preparation unit including a preparation station for setting a workpiece on a pallet, a pallet magazine system including a plurality of movable stations each capable of carrying and moving a pallet and having a plurality of first pallet change positions each associated with each of the machine tools and a second pallet change position associated with the preparation unit, a plurality of first pallet change devices each associated with each of the machine tools and each capable of transferring a pallet between the working area of the associated machine tool and the associated one of said first pallet change positions, a second pallet change device associated with the preparation table and capable of transferring a pallet from the preparation unit to the second pallet change position, a plurality of numerical control devices each associated with each of the machine tools and each capable of storing part programs each containing an end instruction at or near the end of the program and of controlling the associated machine tool in accordance with the part programs, a preparation unit control device capable of controlling the preparation unit for setting a workpiece on a pallet and transferring the pallet carrying the workpiece to the second pallet position, and a system controller responsive to the end instruction from any of the numerical control devices for controlling the pallet magazine system to position the pallet carrying a workpiece to be machined next to the pallet change position associated with that one of the numerical control devices which has produced the end instruction and giving said one of the numerical control devices an instruction to select, among the part programs stored in said one of the numerical systems, the part program which should be used for the next machining said system controller comprising:
first memory means for storing, in relation to each of the schedule numbers indicating order of machining, an indicium of a pallet to be machined in the indicated order and an indicium of a part program to be used for machining the related pallet,
second memory means for storing, in relation to an indicium of each of the pallets, an indicium of the movable station or the preparation table carrying the related pallet or the working area in which the related pallet is placed, and
third memory means for storing, in rleation to an indicium of each of part programs, one or more indicia of the numerical control devices storing the related part program.

34. A machining system according to claim 33, wherein said preparation unit control device is adapted to produce a preparation end signal indicating the completion of the preparation, and said system controller is adapted to control, responsive to the preparation end signal, the pallet magazine system to position a pallet which has been excluded from the machining operation to the second pallet change position.

35. A machining system according to claim 34, wherein said preparation unit control device is provided with display means for indicating that the pallet which has been excluded from the machining has been positioned to the second pallet change position.

36. A machining system according to claim 34, wherein said system controller is adapted to provide, when the pallet which has been excluded from the machining, an instruction to said preparation unit control device to actuate the second pallet change device.

37. A machining system according to claim 34, wherein said preparation unit control device is provided with data input means for changing the contents of said first memory device including the schedule number and the indicia of the part programs concerning the pallet on which a workpiece has been set.

38. A control system according to claim 37, wherein said system controller includes a buffer register for temporarily storing data inputted by means of said data input means, and said system controller is adapted to transfer the data stored in said buffer register to said first memory means when an interrupt is permitted during the progress of the system program.

39. An operation control system for controlling a machining system including a plurality of machine tools each capable of performing, in a working area thereof, machining on a workpiece carried on a pallet, a pallet magazine system including a plurality of movable stations each capable of carrying and conveying a pallet and having a plurality of pallet change positions each associated with each of the machine tools, and a plurality of pallet change devices each associated with each of the machine tools and each capable of transferring a pallet between the working area of the associated machine tool and the associated pallet change position, each of the machine tools being associated with a numerical control device capable of storing part programs and of controlling the associated machine tool, said operation control system comprising:
first memory means for storing, in relation to each of the schedule numbers indicating order of machining, an indicium of a pallet carrying a workpiece to be machined in the indicated order and an indicium of a part program to be used for machining the related pallet, and
second memory means for storing, in relation to an indicium of each of the pallets, an indicium of the movable station carrying the related pallet.

40. A control system according to claim 39, further comprising a central processing unit which is capable of assigning, in accordance with the contents of the first memory means, a part program to be used for machining a workpiece on a pallet which has been transferred into the working area of a machine tool and instructing the associated numerical control device to start machining in accordance with the assigned part program.

41. A control system according to claim 40, wherein each of the part programs contains an end instruction indicating completion of the machining, and said central processing unit is capable of referring, responsive to an end instruction from any of the numerical control devices, to the first memory means to determine the pallet carrying the workpiece to be machined next and the part program to be used for the next machining.

42. A control system according to claim 41, wherein said central processing unit is capable of referring, responsive to the indicium of the pallet carrying the workpiece to be machined next, to the second memory means to determine the movable station carrying the above-mentioned pallet and of instructing the pallet magazine system to move the above-mentioned movable station and hence the above-mentioned pallet to the pallet change position associated with the numerical control device that has produced the end instruction.

43. A control system according to claim 42, wherein each of the numerical control devices is capable of causing pallet change operation of the associated pallet change device and said central processing unit is capable of instructing, upon positioning of the pallet carrying the workpiece to be machined next to the pallet change position associated with the numerical control device that has produced the end instruction, the abovementioned numerical control device to cause the pallet change operation.

44. A control system according to claim 40, further comprising third memory means for storing in relation to an indicium of each of part programs, one or more indicia of the numerical control devices storing the related part program.

45. A control system according to claim 44, wherein said central processing unit is capable of referring, responsive to the indicium of the part program to be used for the next machining, to third memory means to determine whether or not the above-mentioned part program is stored in the numerical control system to be used in the next machining, and to instruct, if the above-mentioned part program is found not to be stored, again to the first memory means to determine, the pallet and the part program related to the schedule number of the succeeding order, the reference by said central processing unit to the first and the third memory means being repeated until the part program read out of the first memory means is found, by reference to the third memory means, to be stored in the above-mentioned numerical control device, and the instruction by the central processing unit to start machining being given only upon confirmation that the part program to be used in the next machining is stored in the numerical control device to be used in the next machining.

46. A control system according to claim 39, further comprising display means capable of displaying, at least part of the contents of the first and the second memory means in the form of a table.

47. A control system according to claim 39, further comprising third memory means for storing, in relation to an indicium of each of part programs, one or more indicia of the numerical control devices storing the related part program.

48. a control system according to claim 47, wherein said central processing unit is capable of referring to the third memory means to ascertain that the part program to be used for the next machining is stored in the numerical control device to be used in the next machining.

49. A control system according to claim 47, further comprising display means capable of displaying, at least partially at a time, the contents of the first, the second and the third memory means in the form of a table.

* * * * *